United States Patent
Zhang et al.

(10) Patent No.: US 11,985,617 B2
(45) Date of Patent: May 14, 2024

(54) FULL DUPLEX TIMING ADVANCE ENHANCEMENTS

(71) Applicant: QUALCOMM Incorporated, San Diego, CA (US)

(72) Inventors: Qian Zhang, Basking Ridge, NJ (US); Yan Zhou, San Diego, CA (US); Junyi Li, Fairless Hills, PA (US); Navid Abedini, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 361 days.

(21) Appl. No.: 17/410,885

(22) Filed: Aug. 24, 2021

(65) Prior Publication Data

US 2022/0078738 A1 Mar. 10, 2022

Related U.S. Application Data

(60) Provisional application No. 63/074,922, filed on Sep. 4, 2020.

(51) Int. Cl.
*H04W 56/00* (2009.01)
*H04L 5/14* (2006.01)
*H04L 27/26* (2006.01)

(52) U.S. Cl.
CPC ......... *H04W 56/0045* (2013.01); *H04L 5/14* (2013.01); *H04L 27/2607* (2013.01)

(58) Field of Classification Search
None
See application file for complete search history.

(56) References Cited

U.S. PATENT DOCUMENTS

| | | | |
|---|---|---|---|
| 2019/0281571 A1* | 9/2019 | Ren | H04W 74/08 |
| 2021/0136777 A1* | 5/2021 | Lou | H04B 17/309 |
| 2022/0085943 A1* | 3/2022 | Zhu | H04L 5/0051 |
| 2022/0330192 A1* | 10/2022 | Zhang | H04B 7/063 |

FOREIGN PATENT DOCUMENTS

| | | |
|---|---|---|
| EP | 3457740 A1 | 3/2019 |
| WO | 2017139014 A1 | 8/2017 |
| WO | 2018067263 A1 | 4/2018 |

OTHER PUBLICATIONS

International Search Report and Written Opinion—PCT/US2021/047578—ISA/EPO—dated Dec. 10, 2021.

\* cited by examiner

*Primary Examiner* — Marcus Smith
(74) *Attorney, Agent, or Firm* — Patterson + Sheridan, LLP

(57) ABSTRACT

Aspects relate to reporting timing adjustment for full-duplex (FD) communications. A method by a user equipment (UE) may include receiving a first timing advance signal from a base station, determining, based on the first timing advance signal, a timing difference between a downlink signal and an uplink signal is not within a threshold, transmitting a timing report to the base station, including the determined timing difference, and receiving, from the base station, an updated timing advance signal for full-duplex (FD) communication based on the timing report.

27 Claims, 20 Drawing Sheets

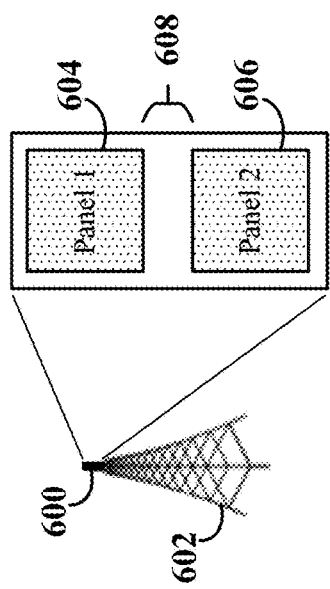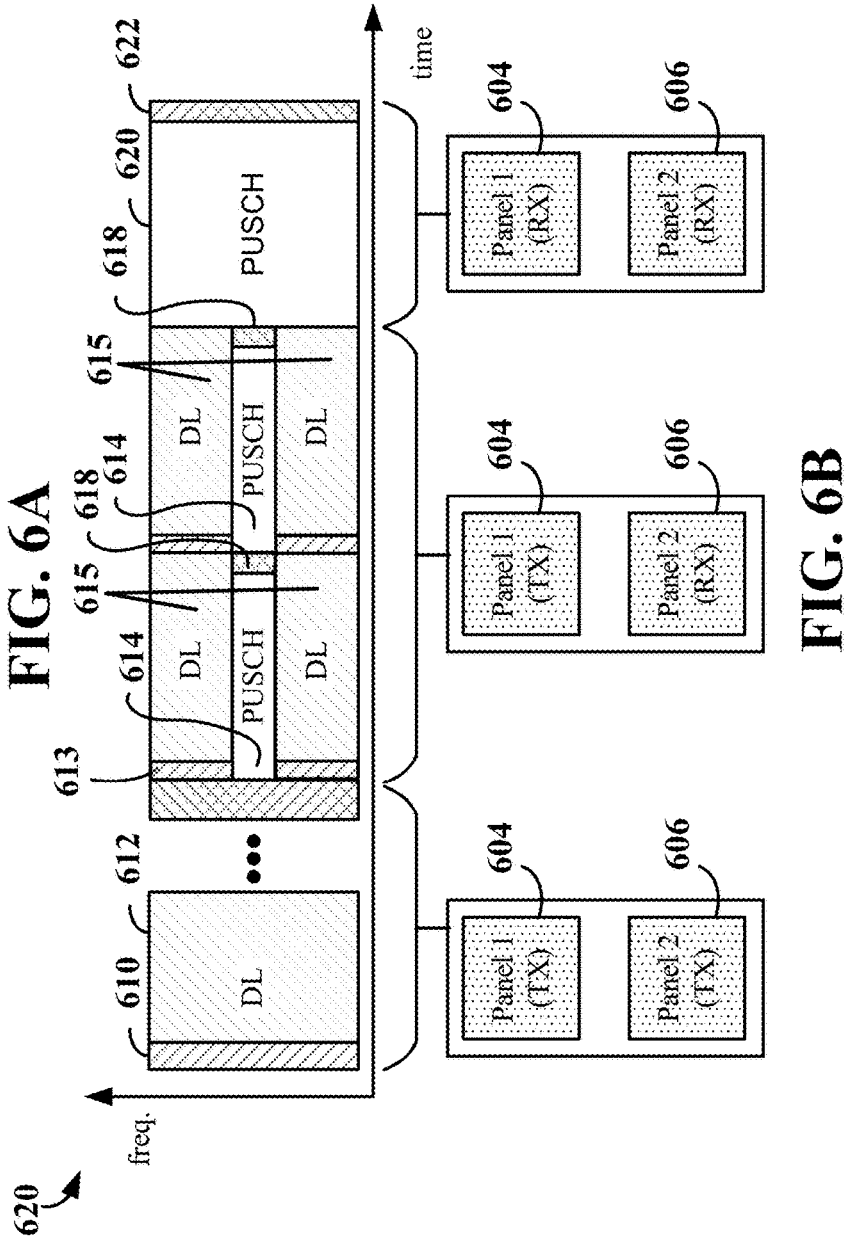

FULL DUPLEX TIMING ADVANCE ENHANCEMENTS

CROSS-REFERENCE TO RELATED APPLICATIONS

This application claims the benefit of and priority to U.S. Provisional Application No. 63/074,922, filed Sep. 4, 2020, which is hereby assigned to the assignee hereof and hereby expressly incorporated by reference herein in its entirety as if fully set forth below and for all applicable purposes.

TECHNICAL FIELD

The technology discussed below relates generally to wireless communication networks, and more particularly, to timing advance capability and full-duplex timing advance in simultaneous uplink and downlink scenarios.

INTRODUCTION

In wireless communication systems, such as those specified under standards for 5G New Radio (NR), a base station and user equipment (UE) may utilize beamforming to compensate for high path loss and short range. Beamforming is a signal processing technique used with an antenna array module for directional signal transmission and/or reception. Each antenna in the antenna array module transmits a signal that is combined with other signals of other antennas of the same array in such a way that signals at particular angles experience constructive interference while others experience destructive interference.

The base station and the UE can select one or more beam pair links (BPLs) for communication between the base station and the UE on a downlink and/or an uplink. Each BPL includes corresponding transmit and receive beams on the base station and the UE. For example, on the downlink, a BPL includes a transmit beam on the base station and a receive beam on the UE. To increase the data rate, multiple BPLs can be used to facilitate spatial multiplexing of multiple data streams from the base station to the UE.

To reduce latency and enhance the spectrum efficiency in a cell, full duplex (FD) communications may be used in 5G systems. FD allows simultaneous two-way communication by using spatial multiplexing and/or frequency multiplexing. In the case of FD using spatial multiplexing, different panels (which may be referred to simply as panels) and beams are operable at the same time but still can achieve FD simultaneous communications through spatial separation (e.g., such as through beam direction). The downlink and uplink frequency bands in FD communications may be fully overlapped, partially overlapped or separated with a guard band in between.

In networks using FD communications, timing synchronization, and particularly timing alignment for uplink and downlink communications at the UE, becomes an important factor in reducing signal degradation and potential signal loss due to inter-symbol interference and leakage.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some aspects, a method of full duplex (FD) communication performed by a user equipment (UE) is disclosed. The method may include receiving a first timing advance signal from a base station, determining, based on the first timing advance signal, a timing difference between a downlink signal and an uplink signal is not within a threshold, transmitting a timing report to the base station, including the determined timing difference, and receiving, from the base station, an updated timing advance signal for full-duplex (FD) communication based on the timing report.

In some aspects, a user equipment (UE) for full duplex (FD) communication is disclosed. The UE includes a transceiver; a memory; and a processor communicatively coupled to the transceiver and the memory, wherein the processor and the memory are configured to: receive a first timing advance signal from a base station, determine, based on the first timing advance signal, a timing difference between a downlink signal and an uplink signal is not within a threshold, transmit a timing report to the base station, including the determined timing difference, and receive, from the base station, an updated timing advance signal for full-duplex (FD) communication based on the timing report.

In some aspects, a user equipment (UE) for full duplex (FD) communication is disclosed. The UE includes means for receiving a first timing advance signal from a base station, means for determining, based on the first timing advance signal, a timing difference between a downlink signal and an uplink signal is not within a threshold, means for transmitting a timing report to the base station, including the determined timing difference, and means for receiving, from the base station, an updated timing advance signal for full-duplex (FD) communication based on the timing report.

In some aspects, a non-transitory computer-readable medium for full duplex (FD) communication is discloses. The non-transitory computer-readable medium includes instructions executable by one or more processors of a user equipment (UE) to: receive a first timing advance signal from a base station, determine, based on the first timing advance signal, a timing difference between a downlink signal and an uplink signal is not within a threshold, transmit a timing report to the base station, including the determined timing difference, and receive, from the base station, an updated timing advance signal for full-duplex (FD) communication based on the timing report.

In some aspects, a method of full duplex (FD) communication performed by a base station is disclosed. The method may include transmitting a first timing advance signal to a user equipment (UE), receiving, based on the first timing advance signal, a timing report from the UE including a timing difference between a downlink signal and an uplink signal, and transmitting an updated timing advance signal to the UE for full-duplex (FD) communication based on the received timing report.

In some aspects, a base station for full duplex (FD) communication is disclosed. The base station includes a transceiver; a memory; and a processor communicatively coupled to the transceiver and the memory, wherein the processor and the memory are configured to: transmit a first timing advance signal to a user equipment (UE), receive, based on the first timing advance signal, a timing report from the UE including a timing difference between a downlink signal and an uplink signal, and transmit an updated timing advance signal to the UE for full-duplex (FD) communication based on the received timing report.

In some aspects, a base station for full duplex (FD) communication is disclosed. The base station includes means for receiving a first timing advance signal from a base station, means for transmitting a first timing advance signal to a user equipment (UE), means for receiving, based on the first timing advance signal, a timing report from the UE including a timing difference between a downlink signal and an uplink signal, and means for transmitting an updated timing advance signal to the UE for full-duplex (FD) communication based on the received timing report.

In some aspects, a non-transitory computer-readable medium for full duplex (FD) communication is discloses. The non-transitory computer-readable medium includes instructions executable by one or more processors of a base station to: receive a first timing advance signal from a base station, determine, based on the first timing advance signal, a timing difference between a downlink signal and an uplink signal is not within a threshold, transmit a timing report to the base station, including the determined timing difference, and receive, from the base station, an updated timing advance signal for full-duplex (FD) communication based on the timing report.

In some aspects, a method of full duplex (FD) communication performed by a user equipment (UE) is disclosed. The method may include receiving a first timing advance signal from a base station, determining a variable compensation factor associated with a timing difference between a downlink signal and an uplink signal based on the first timing advance signal, transmitting, to the base station, a timing report, including the determined variable compensation factor, and receiving, from the base station, an updated timing advance signal for FD communication based on the timing report.

In some aspects, a user equipment (UE) for full duplex (FD) communication is disclosed. The UE includes a transceiver; a memory; and a processor communicatively coupled to the transceiver and the memory, wherein the processor and the memory are configured to: receive a first timing advance signal from a base station, determine a variable compensation factor associated with a timing difference between a downlink signal and an uplink signal based on the first timing advance signal, transmit, to the base station, a timing report, including the determined variable compensation factor, and receive, from the base station, an updated timing advance signal for FD communication based on the timing report.

In some aspects, a user equipment (UE) for full duplex (FD) communication is disclosed. The UE includes means for receiving a first timing advance signal from a base station, means for determining a variable compensation factor associated with a timing difference between a downlink signal and an uplink signal based on the first timing advance signal, means for transmitting, to the base station, a timing report, including the determined variable compensation factor, and means for receiving, from the base station, an updated timing advance signal for FD communication based on the timing report.

In some aspects, a non-transitory computer-readable medium for full duplex (FD) communication is discloses. The non-transitory computer-readable medium includes instructions executable by one or more processors of a user equipment (UE) to: receive a first timing advance signal from a base station, determine a variable compensation factor associated with a timing difference between a downlink signal and an uplink signal based on the first timing advance signal, transmit, to the base station, a timing report, including the determined variable compensation factor, and receive, from the base station, an updated timing advance signal for FD communication based on the timing report.

In some aspects, a method of full duplex (FD) communication performed by a base station is disclosed. The method may include transmitting a first timing advance signal to a user equipment (UE), receiving a timing report from the UE including a variable compensation factor associated with a timing difference between a downlink signal and an uplink signal based on the first timing advance signal, and transmitting an updated timing advance signal to the UE based on the received timing report.

In some aspects, a base station for full duplex (FD) communication is disclosed. The base station includes a transceiver; a memory; and a processor communicatively coupled to the transceiver and the memory, wherein the processor and the memory are configured to: transmit a first timing advance signal to a user equipment (UE), receive a timing report from the UE including a variable compensation factor associated with a timing difference between a downlink signal and an uplink signal based on the first timing advance signal, and transmit an updated timing advance signal to the UE based on the received timing report.

In some aspects, a base station for full duplex (FD) communication is disclosed. The base station includes means for transmitting a first timing advance signal to a user equipment (UE), means for receiving a timing report from the UE including a variable compensation factor associated with a timing difference between a downlink signal and an uplink signal based on the first timing advance signal, and means for transmitting an updated timing advance signal to the UE based on the received timing report.

In some aspects, a non-transitory computer-readable medium for full duplex (FD) communication is discloses. The non-transitory computer-readable medium includes instructions executable by one or more processors of a base station to: transmit a first timing advance signal to a user equipment (UE), receive a timing report from the UE including a variable compensation factor associated with a timing difference between a downlink signal and an uplink signal based on the first timing advance signal, and transmit an updated timing advance signal to the UE based on the received timing report.

These and other aspects of the disclosure will become more fully understood upon a review of the detailed description, which follows. Other aspects, features, and embodiments of the present disclosure will become apparent to those of ordinary skill in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while example embodiments may be discussed below as device, system, or method embodiments it should be understood that such example embodiments can be implemented in various devices, systems, and methods.

BRIEF DESCRIPTION OF THE DRAWINGS

FIG. 6A is a schematic diagram depicting an antenna array of a transmission and reception point (TRP) according to some aspects.

FIG. 6B is a diagram depicting the transmission or reception configuration of the two panels of FIG. 6A.

DETAILED DESCRIPTION

Figure 1:
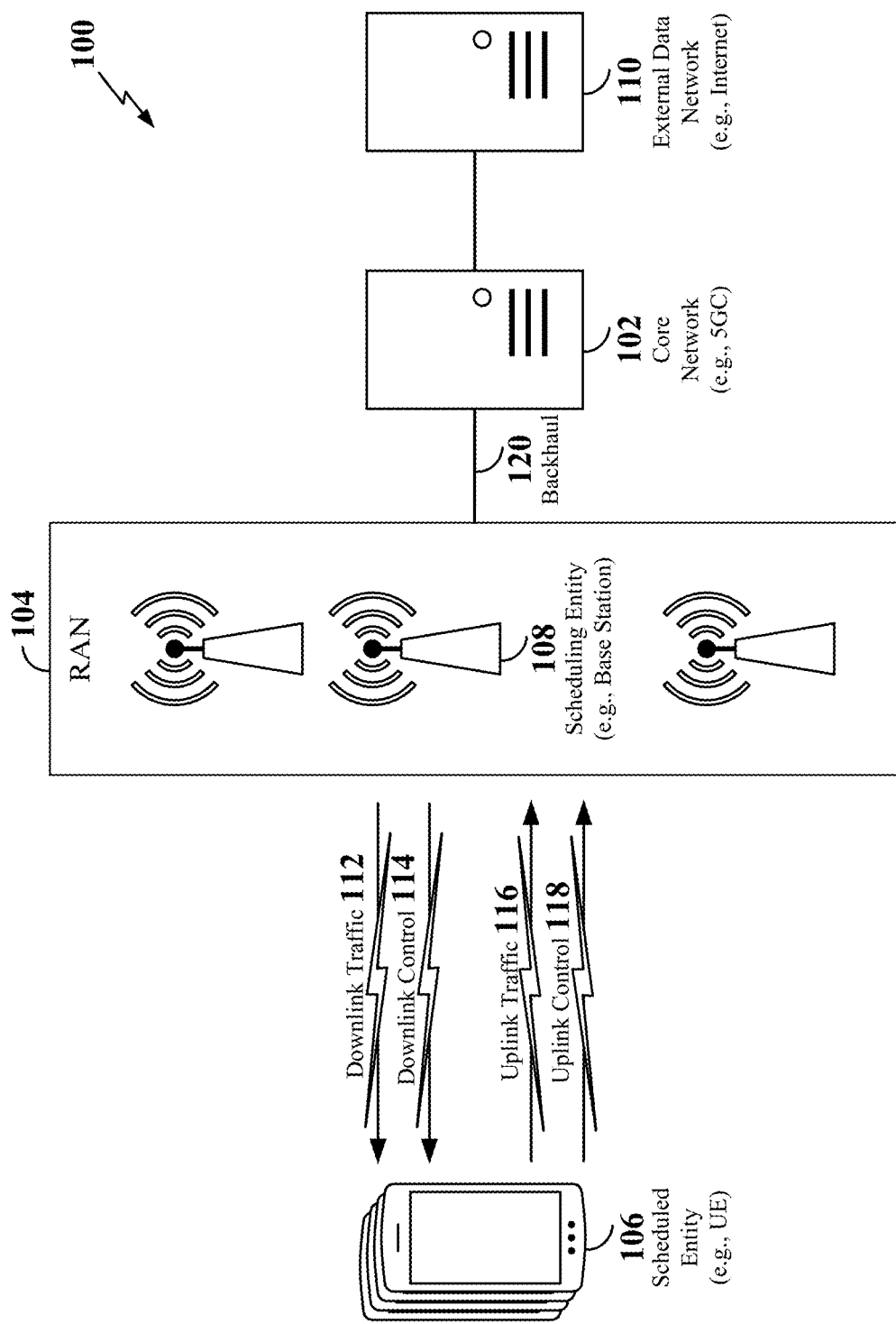
FIG. 1 is a schematic illustration of a wireless communication system according to some aspects.

Aspects of the present disclosure provide apparatus, methods, processing systems, and computer-readable mediums for timing alignment in a cell, including signaling or indication of the application of either a fixed timing advance (TA) value or a range of TA values. In some cases, timing alignment may be achieved by using techniques known as a timing advance that instructs a user equipment (UE) to either advance or retard its timing relative to a current uplink timing. Generally, timing alignment has been achieved using a fixed TA value.

In some cases, full-duplex (FD) communication may be used by at least one of the UE or a serving base station in which downlink transmission and uplink transmissions are transmitted and received simultaneously. However, FD communication presents certain challenges to maintaining timing alignment based on a fixed TA value. Accordingly, aspects of the present disclosure provide techniques for FD TA enhancements that allow a UE in a wireless communication system to request an updated or new timing advance.

For example, in some cases, a UE may measure a timing difference between a downlink signal and an uplink signal based on a received TA value in a TA signal. The UE may then transmit a timing report to a base station, indicating the timing difference. Thereafter, the UE may receive a new or updated TA value to allow the UE 1302. The new or updated TA value may allow the UE to compensate for the timing difference to better align UE-side DL and UL timing. Aligning the UE-side DL and UL timing may reduce the chances of interference and missed or undecodable transmissions and, therefore, improves resource (e.g., time, frequency, power) usage at the UE and the base station in the wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and at least one scheduled entity 106. The at least one scheduled entity 106 may be referred to as a user equipment (UE) 106 in the discussion that follows. The RAN 104 includes at least one scheduling entity 108. The at least one scheduling entity 108 may be referred to as a base station (BS) 108 in the discussion that follows. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a network access node, a transmission and reception point (TRP) or some other suitable terminology. In some examples, a base station may include two or more TRPs that may be co-located or non-co-located. Each TRP may communicate on the same or different carrier frequency within the same or different frequency band.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). And as discussed more below, UEs may communicate directly with other UEs in peer-to-peer fashion and/or in relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
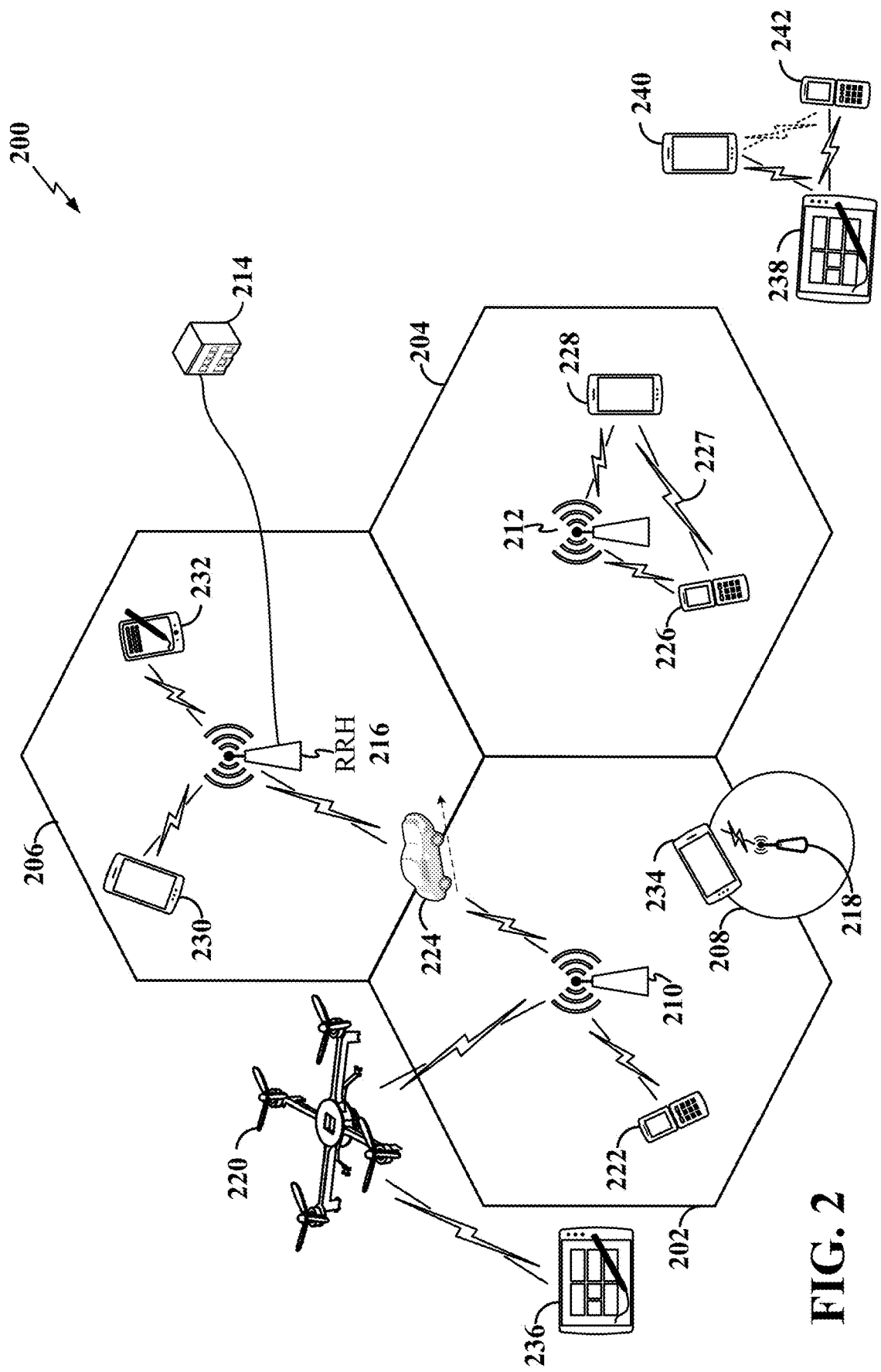
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may each function as a scheduled entity or a non-primary (e.g., secondary) sidelink device. In still another example, a UE may function as a scheduling entity or scheduled entity in a device-to-device (D2D), peer-to-peer (P2P), vehicle-to-vehicle (V2V) network, vehicle-to-everything (V2X) and/or in a mesh network. In a mesh network example, UEs 240 and 242 may optionally communicate directly with one another in addition to communicating with the UE 238 (functioning as a scheduling entity). Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic and sidelink control.

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the RAN 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequency implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
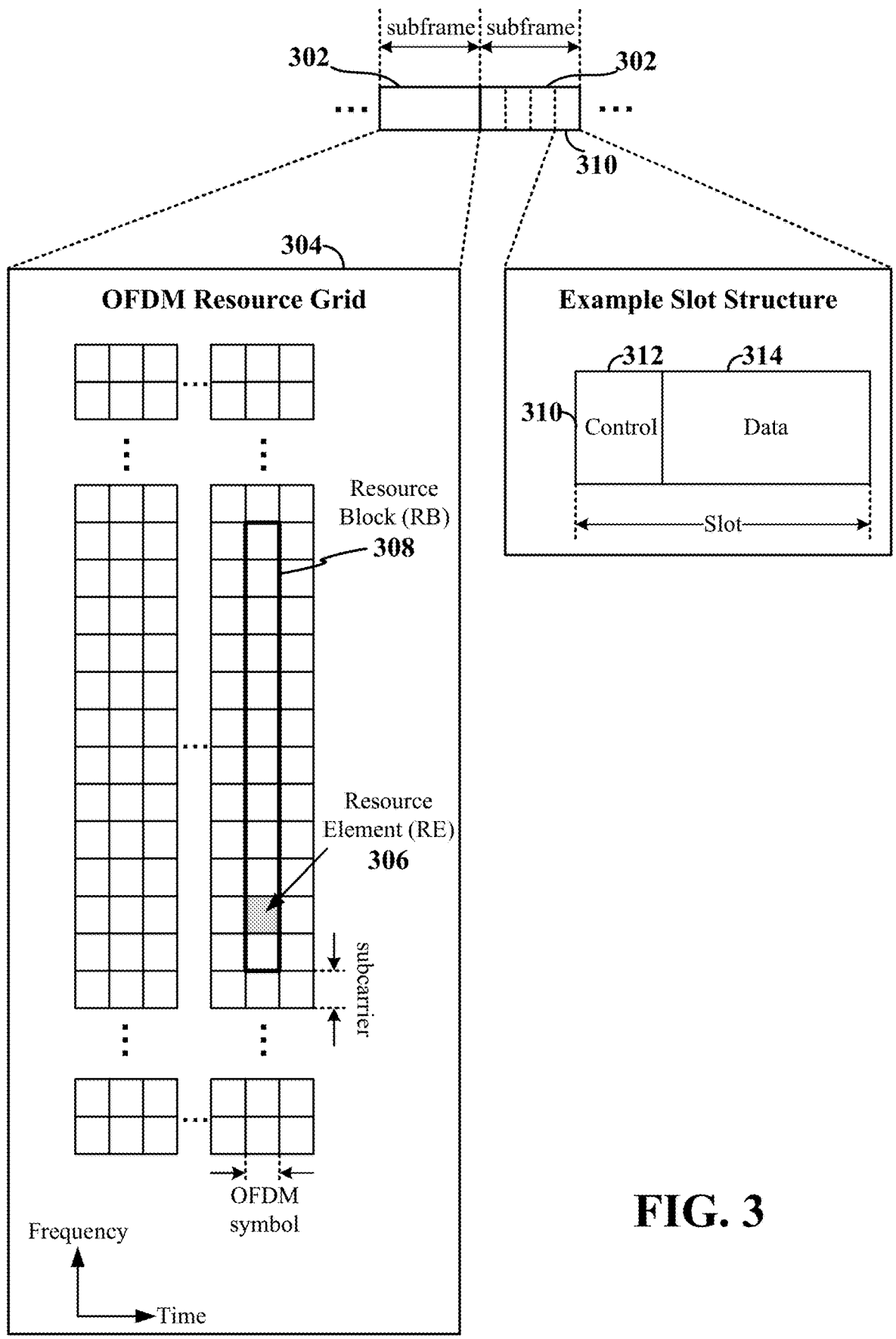
FIG. 3 is a diagram illustrating an example of a frame structure for use in a radio access network according to some aspects.

Referring now to FIG. 3, an expanded view of an example DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs (e.g., scheduled entities) for downlink or uplink transmissions typically involves scheduling one or more REs 306 within one or more sub-bands. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals, including but not limited to a demodulation reference signal (DMRS), a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity) may allocate one or more REs 306 (e.g., within a control region 312) to carry DL control information including one or more DL control channels, such as a PBCH and/or a physical downlink control channel (PDCCH), etc., to one or more scheduled entities. The PDCCH carries downlink control information (DCI) including but not limited to power control commands, scheduling information, a grant, and/or an assignment of REs for DL and UL transmissions. The transmitting device may further allocate one or more REs 306 to carry other DL signals, such as a DMRS; a phase-tracking reference signal (PT-RS); a channel state information-reference signal (CSI-RS); a primary synchronization signal (PSS); and a secondary synchronization signal (SSS). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The synchronization signals PSS and SSS, and in some examples, the PBCH and a PBCH DMRS, may be transmitted in a synchronization signal block (SSB) that includes 4 consecutive OFDM symbols, numbered via a time index in increasing order from 0 to 4. In the frequency domain, the SSB may extend over 240 contiguous subcarriers, with the subcarriers being numbered via a frequency index in increasing order from 0 to 249. Of course, the present disclosure is not limited to this specific SSB configuration. Other non-limiting examples may utilize greater or fewer than two synchronization signals; may include one or more supplemental channels in addition to the PBCH; may omit a PBCH; and/or may utilize a different number of symbols/frequencies and/or nonconsecutive symbols/frequencies for an SSB, within the scope of the present disclosure.

The PBCH may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

As discussed above, a BS may transmit synchronization signals (e.g., including PSS and SSS) in the network to enable UEs to synchronize with the BS, as well as SI (e.g., including a MIB, RMSI, and OSI) to facilitate initial network access. The BS may transmit the PSS, the SSS, and/or the MIB via SSBs over PBCH and may broadcast the RMSI and/or the OSI over the PDSCH.

A UE attempting to access the network may perform an initial cell search by detecting a PSS from a BS (e.g., the PSS of a cell of the BS). The PSS may enable the UE to synchronize to period timing of the BS and may indicate a physical layer identity value assigned to the cell. The UE may also receive an SSS from the BS that enables the UE to synchronize on the radio frame level with the cell. The SSS may also provide a cell identity value, which the UE may combine with the physical layer identity value to identify the cell.

After receiving the PSS and SSS, the UE may receive system information from the BS. The system information may take the form of a master information block (MIB) and system information blocks (SIBs). The system information includes essential or critical information for a UE to access the network such as downlink (DL) channel configuration information, uplink (UL) channel configuration information, access class information, and cell barring information, as well as other less critical information. The MIB may include system information for initial network access and scheduling information for RMSI and/or OSI. After decoding the MIB, the UE may receive RMSI and/or OSI.

After obtaining the MIB, the RMSI and/or the OSI, the UE may perform a random access procedure for initial access to a RAN (e.g., the RAN 200 of FIG. 2). The RAN (e.g., a base station) broadcasts information that enables a UE to determine how to conduct the initial access. This information may include a configuration for a random access channel (RACH) that the UE uses to communicate with the RAN during initial access. The RACH configuration may indicate, for example, the resources allocated by the RAN for the RACH (e.g., resources allocated for transmitting RACH preambles and receiving random access responses).

For the random access procedure, the UE may transmit a random access preamble and the BS may respond with a random access response. Upon receiving the random access response, the UE may transmit a connection request to the BS and the BS may respond with a connection response (e.g., contention resolution message). After establishing a connection, the UE and the BS may enter a normal operation stage, where operational data may be exchanged. For example, the BS may schedule the UE for UL communication and/or DL communication.

In an UL transmission, the transmitting device (e.g., the scheduled entity 106) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. For example, the UL control information may include a DMRS or an SRS. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include hybrid automatic repeat request (HARQ) feedback, channel state feedback (CSF), or any other suitable UL control information.

In addition to control information, one or more REs 306 (e.g., within the data region 314) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry SIBs (e.g., SIB1), carrying information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
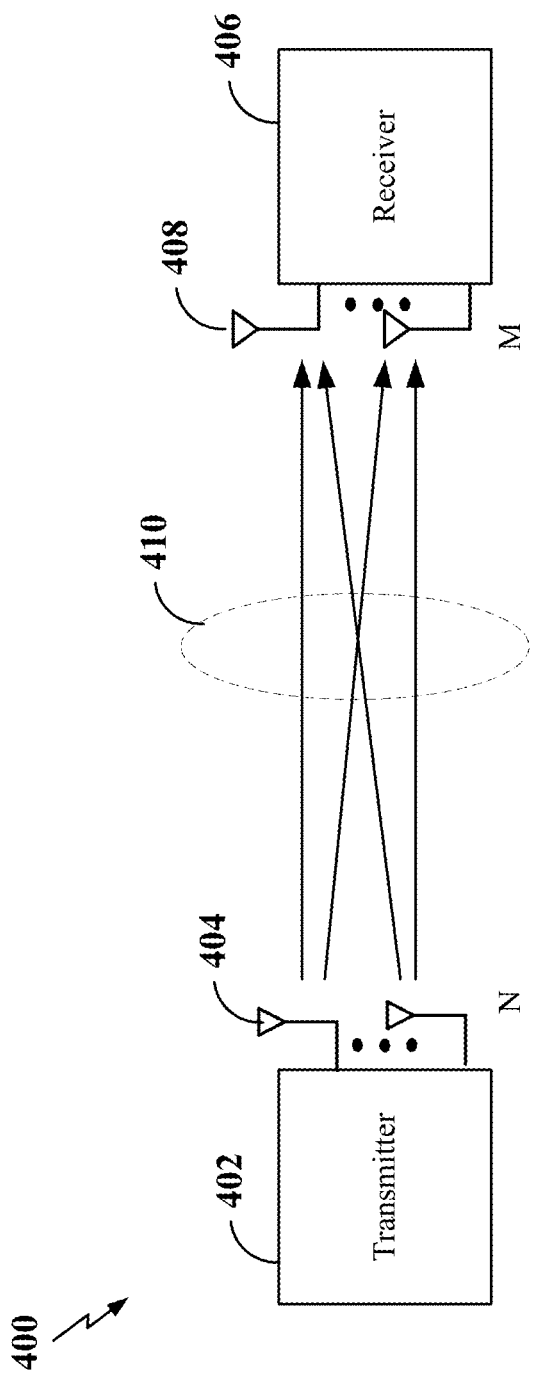
FIG. 4 is a block diagram illustrating an example of a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the wireless communication system 400 (MIMO system) is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In 5G New Radio (NR) systems, particularly for above 6 GHz or mmWave systems, beamformed signals may be utilized for most downlink channels, including the physical downlink control channel (PDCCH) and physical downlink shared channel (PDSCH). In addition, broadcast control information, such as the SSB, slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH).

A base station (e.g., gNB) may generally be capable of communicating with UEs using transmit beams (e.g., downlink transmit beams) of varying beam widths. For example, a base station may be configured to utilize a wider beam when communicating with a UE that is in motion and a narrower beam when communicating with a UE that is stationary. The UE may further be configured to utilize one or more downlink receive beams to receive signals from the base station. In some examples, to select one or more downlink transmit beams and one or more downlink receive beams for communication with a UE, the base station may transmit a reference signal, such as an SSB or CSI-RS, on each of a plurality of downlink transmit beams in a beam-sweeping manner. The UE may measure the reference signal received power (RSRP) on each of the downlink transmit beams using one or more downlink receive beams on the UE and transmit a beam measurement report to the base station indicating the RSRP of each of the measured downlink transmit beams. The base station may then select one or more serving downlink beams (e.g., downlink transmit beams and downlink receive beams) for communication with the UE based on the beam measurement report. The resulting selected downlink transmit beam and downlink receive beam may form a downlink beam pair link. In other examples, when the channel is reciprocal, the base station may derive the particular downlink beam(s) to communicate with the UE based on uplink measurements of one or more uplink reference signals, such as sounding reference signals (SRSs).

Similarly, uplink beams (e.g., uplink transmit beam(s) at the UE and uplink receive beam(s) at the base station) may be selected by measuring the RSRP of received uplink reference signals (e.g., SRSs) or downlink reference signals (e.g., SSBs or CSI-RSs) during an uplink or downlink beam sweep. For example, the base station may determine the uplink beams either by uplink beam management via a SRS beam sweep with measurement at the base station or by downlink beam management via an SSB/CSI-RS beam sweep with measurement at the UE. The selected uplink beam may be indicated by a selected SRS resource (e.g., time-frequency resources utilized for the transmission of a SRS) when implementing uplink beam management or a selected SSB/CSI-RS resource when implementing downlink beam management. For example, the selected SSB/CSI-RS resource can have a spatial relation to the selected uplink transmit beam (e.g., the uplink transmit beam utilized for the PUCCH, SRS, and/or PUSCH). The resulting selected uplink transmit beam and uplink receive beam may form an uplink beam pair link.

Figure 5:
FIG. 5 is a diagram illustrating an example of communication between a radio access network (RAN) node and a wireless communication device using beamforming according to some aspects.

FIG. 5 is a diagram illustrating communication between a base station 504 and a UE 502 using beamformed signals according to some aspects. The base station 504 may be any of the base stations (e.g., gNBs) or scheduling entities illustrated in FIGS. 1 and/or 2, and the UE 502 may be any of the UEs or scheduled entities illustrated in FIGS. 1 and/or 2.

In the example shown in FIG. 5, the base station 504 is configured to generate a plurality of beams 506a-506h, each associated with a different beam direction. In addition, the UE 502 is configured to generate a plurality of beams 508a-508e, each associated with a different beam direction. The base station 504 and UE 502 may select one or more beams 506a-506h on the base station 504 and one or more beams 508a-508e on the UE 502 for communication of uplink and downlink signals therebetween using a downlink beam management scheme and/or an uplink beam management scheme.

In an example of a downlink beam management scheme for selection of downlink beams, the base station 504 may be configured to sweep or transmit on each of a plurality of downlink transmit beams 506a-506h during one or more synchronization slots. For example, the base station 504 may transmit a reference signal, such as an SSB or CSI-RS, on each beam in the different beam directions during the synchronization slot. Transmission of the beam reference signals may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). It should be noted that while some beams are illustrated as adjacent to one another, such an arrangement may be different in different aspects. For example, downlink transmit beams 506a-506h transmitted during a same symbol may not be adjacent to one another. In some examples, the base station 504 may transmit more or less beams distributed in all directions (e.g., 360 degrees).

In addition, the UE 502 is configured to receive the downlink beam reference signals on a plurality of downlink receive beams 508a-508e. In some examples, the UE 502 searches for and identifies each of the downlink transmit beams 506a-506h based on the beam reference signals. The UE 502 then performs beam measurements (e.g., RSRP, SINR, RSRQ, etc.) on the beam reference signals on each of the downlink receive beams 508a-508e to determine the respective beam quality of each of the downlink transmit beams 506a-506h as measured on each of the downlink receive beams 508a-508e.

The UE 502 can generate and transmit a beam measurement report, including the respective beam index and beam measurement of each downlink transmit beam 506a-506h on each downlink receive beam 508a-508e to the base station 504. The base station 504 may then select one or more downlink transmit beams on which to transmit unicast downlink control information and/or user data traffic to the UE 502. In some examples, the selected downlink transmit beam(s) have the highest gain from the beam measurement report. In some examples, the UE 502 can further identify the downlink transmit beams selected by the base station from the beam measurements. Transmission of the beam measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The base station 504 or the UE 502 may further select a corresponding downlink receive beam on the UE 502 for each selected serving downlink transmit beam to form a respective downlink beam pair link (BPL) for each selected serving downlink transmit beam. For example, the UE 502 can utilize the beam measurements to select the corresponding downlink receive beam for each serving downlink transmit beam. In some examples, the selected downlink receive beam to pair with a particular downlink transmit beam may have the highest gain for that particular downlink transmit beam.

In one example, a single downlink transmit beam (e.g., beam 506d) on the base station 504 and a single downlink receive beam (e.g., beam 508c) on the UE may form a single downlink BPL used for communication between the base station 504 and the UE 502. In another example, multiple downlink transmit beams (e.g., beams 506c, 506d, and 506e) on the base station 504 and a single downlink receive beam (e.g., beam 508c) on the UE 502 may form respective downlink BPLs used for communication between the base station 504 and the UE 502. In another example, multiple downlink transmit beams (e.g., beams 506c, 506d, and 506e) on the base station 504 and multiple downlink receive beams (e.g., beams 508c and 508d) on the UE 502 may form multiple downlink BPLs used for communication between the base station 504 and the UE 502. In this example, a first downlink BPL may include downlink transmit beam 506c and downlink receive beam 508c, a second downlink BPL may include downlink transmit beam 506d and downlink receive beam 508c, and a third downlink BPL may include downlink transmit beam 506e and downlink receive beam 508d.

When the channel is reciprocal, the above-described downlink beam management scheme may also be used to select one or more uplink BPLs for uplink communication from the UE 502 to the base station 504. For example, the downlink BPL formed of beams 506d and 508e may also serve as an uplink BPL. Here, beam 508c is utilized as an uplink transmit beam, while beam 506d is utilized as an uplink receive beam.

In an example of an uplink beam management scheme, the UE 502 may be configured to sweep or transmit on each of a plurality of uplink transmit beams 508a-508e. For example, the UE 502 may transmit an SRS on each beam in the different beam directions. In addition, the base station 504 may be configured to receive the uplink beam reference signals on a plurality of uplink receive beams 506a-506h. In some examples, the base station 504 searches for and identifies each of the uplink transmit beams 508a-508e based on the beam reference signals. The base station 504 then performs beam measurements (e.g., RSRP, SINR, RSRQ, etc.) on the beam reference signals on each of the uplink receive beams 506a-506h to determine the respective beam quality of each of the uplink transmit beams 508a-508e as measured on each of the uplink receive beams 506a-506h.

The base station 504 may then select one or more uplink transmit beams on which the UE 502 will transmit unicast downlink control information and/or user data traffic to the base station 504. In some examples, the selected uplink transmit beam(s) have the highest gain. The base station 504 may further select a corresponding uplink receive beam on the base station 504 for each selected serving uplink transmit beam to form a respective uplink beam pair link (BPL) for each selected serving uplink transmit beam. For example, the base station 504 can utilize the beam measurements to select the corresponding uplink receive beam for each serving uplink transmit beam. In some examples, the selected uplink receive beam to pair with a particular uplink transmit beam may have the highest gain for that particular uplink transmit beam.

The base station 504 may then notify the UE 502 of the selected uplink transmit beams. For example, the base station 504 may provide the SRS resource identifiers (IDs) identifying the SRSs transmitted on the selected uplink transmit beams. In some examples, the base station 504 may apply each selected uplink transmit beam (and corresponding uplink receive beam) to an uplink signal (e.g., PUCCH, PUSCH, SRS, etc.) and transmit the respective SRS resource IDs associated with the selected uplink transmit beams applied to each uplink signal to the UE 502. When the channel is reciprocal, the above-described uplink beam management scheme may also be used to select one or more downlink BPLs for downlink communication from the base station 504 to the UE 502. For example, the uplink BPLs may also be utilized as downlink BPLs.

FIG. 6A is a schematic diagram depicting at least one antenna array 600 of a TRP 602 according to some aspects of the disclosure. The discussion that follows also may be applicable to an antenna array in another type of device (e.g., a UE). The antenna array 600 may include two panels (panel 1 604, panel 2 606) with a physical separation 608 therebetween. Each of the two panels may be a subarray of a single antenna array or two different antenna arrays. A given panel may transmit and/or receive a beam or a beam group.

FIG. 6B is a diagram depicting the transmission or reception configuration of the two panels (panel 1 604, panel 2 606) of FIG. 6A. The transmission (TX) and reception (RX) configurations of the two panels are depicted for various DL and UL channels as may be implemented in a device (e.g., a scheduling entity or a scheduled entity) implementing flexible FDD according to some aspects of the disclosure. Flexible FFD includes the use of two panels that may operate in either a TDD mode (with both panels on the gNB and one or more panels on the UE configured for either DL or UL) or an SBFD mode (with one panel on each of the gNB and UE configured for UL and another panel on each of the gNB and UE configured for DL).

At the left of FIG. 6B, when the antenna array 600 is communicating in only a single direction at a time, both panel 1 604 and panel 2 606 may be configured for the single-direction communication as an example of a TDD mode showing the DL transmission. For example, both panels 604 and 606 may be configured to transmit DL control 610 and DL data 612, as an example of DL transmissions during TDD mode. At the center of FIG. 6B, when the antenna array 600 is simultaneously transmitting a combination of DL control 613 and DL data 615 and receiving UL data (e.g., PUSCH 614) and UL control 618, panel 1 604 may be configured for DL transmission (i.e., TX) and panel 2 606 may be configured for UL reception (i.e., RX). At the right of FIG. 6B, when the antenna array 600 is only receiving UL data (e.g., PUSCH 620) and UL control 622, both panel 1 604 and panel 2 606 may be configured for UL reception. The antenna array 600 is thus configured for both TDD and full duplex operation (e.g., flexible TDD). The physical separation 608 between panel 1 604 and panel 2 606 may provide improved isolation between the panels (e.g., greater than about 50 dB of improved isolation) when compared to two panels without the physical separation 608.

Introduction to Full-Duplex Communication and Timing Advances

The disclosure relates in some aspects to flexible TDD capabilities for wireless communication. For example, various aspects of the disclosure may be applicable to flexible TDD with full-duplex (FD) operation with simultaneous uplink transmissions and downlink transmissions in FR2 and/or other frequency bands.

This FD capability may be implemented at a base station (e.g., a gNB), a UE, or both. For example, a UE may transmit uplink signals from one panel and receive downlink signals at another panel. In some aspects, duplex performance may depend on whether there is sufficient beam separation and/or other factors.

In some aspects, FD capability may improve (e.g., reduce) latency. For example, a UE may receive downlink signals in slots that are dedicated as uplink-only slots, thereby reducing the latency for the downlink transmission. A UE operating according to half duplex TDD must wait for a scheduled uplink subframe before it is able to send an uplink message to the base station. However, using flexible TDD, the UE can respond with an uplink frame while it is receiving a downlink frame. For example, ultra-reliable low latency communication (URLLC) requires low latency between DL and UL. In FD, the UE can transmit uplink and receive downlink at the same time, thereby improving latency (by eliminating a need to wait for an uplink subframe to transmit an uplink signal.

In some aspects, FD capability may improve spectrum efficiency (e.g., per cell, per UE, etc.). For example, in FD, the same time slots and/or frequency resources may be used concurrently for uplink and downlink transmissions. Also, unused slots in either HD TDD or FDD can be used for simultaneous uplink and downlink, thereby again improving spectral efficiency.

The present disclosure relates in some aspects to timing alignment in a cell including signaling or indication of the application of either a fixed timing advance (TA) value or a range of TA values. Provisioning of a range of values provides more flexibility to a UE or base station to adjust or compensate within the range in order to provide timing alignment. During operation, a 5G NR uplink allows for uplink intracell orthogonality so that uplink transmissions received from different devices within a cell do not cause interference to each other. A feature for this uplink orthogonality is that the uplink slot boundaries for a given numerology are (approximately) time aligned at the base station. More specifically, any timing misalignment between received signals should fall within a cyclic prefix (CP). To ensure such receiver-side time alignment, 5G NR includes a mechanism for transmitting a TA signal or indication. While similar to previous technologies such as LTE, TA in 5G NR is different in that it uses different timing advance step sizes for different numerologies.

Generally, TA is a negative offset applied at a wireless device (e.g., UE), between the start of a downlink (DL) symbol (or subframe) as observed by the wireless device and the start of an uplink (UL) symbol (or subframe). By controlling the offset appropriately for each wireless device, the network (e.g., base station or gNB) may control the timing of the signals received at the base station or gNB from the various wireless devices in a cell being served by the base station or gNB. Wireless devices located far from the base station may encounter a greater propagation delay, and, therefore, should start their uplink transmissions somewhat in advance, compared to devices located closer to the base station with a less propagation delay.

Figure 7:
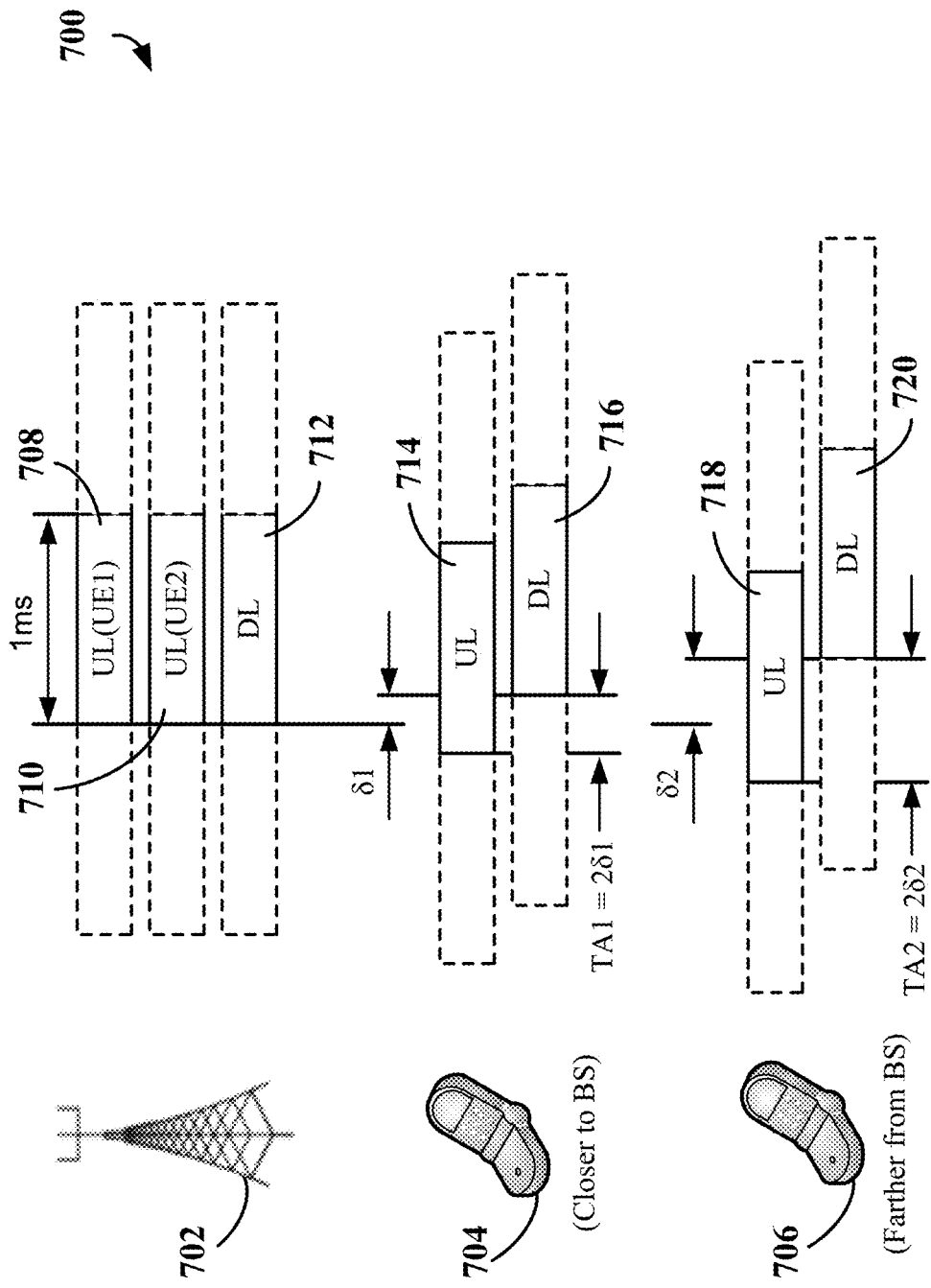
FIG. 7 a signal diagram illustrating a timing advance operation according to some aspects of the disclosure.

FIG. 7 is a signal diagram 700 illustrating a timing advance operation according to some aspects of the disclosure. In this example, a first UE 704 is shown as located closer to a base station 702 (e.g., gNB) and a second UE 706 (e.g., gNB) is shown as located farther from the base station 702. The time-aligned uplink reception and downlink transmissions are illustrated where base station 702 has a first uplink reception 708 from the first UE 704, a second uplink reception 710 from the second UE 706, and a downlink transmission slot 712. The first UE 704 is shown experiencing a small propagation delay M relative to the downlink slot 716. Accordingly, for this UE, a small value of the timing advance offset TA1=2δ1 may be sufficient to compensate for the propagation delay for the uplink slot 714 and to ensure the correct timing at the base station. However, as can be seen in the FIG. 7, a larger value of the timing advance may be required for the second UE 706, which is located at a further distance from the base station and, thus, experiences a larger propagation delay 62 relative to the downlink slot 720. Accordingly, for this device, a larger value of the timing advance offset TA1=2δ2 may be required to compensate for the propagation delay for the uplink slot 718 and to ensure the correct timing at the base station.

In some cases, a TA value for each UE (e.g., UEs 704, 706) may be determined by the network (e.g., base station 702) based on measurements on the respective uplink transmissions. Thus, as long as a UE carries out uplink data transmission, this can be used by the receiving base station to estimate the uplink receive timing, and thus be a source for TA commands. Sounding reference signals (SRS) may be used as a regular signal to measure for purposes of determining TA values, but a person of ordinary skill in the art will appreciate that the base station can use any signal transmitted from the devices.

Based on the uplink measurements, a base station (e.g., base station 702) may determine the required timing correction for each UE. If the timing of a specific device needs correction, the network issues a TA command for the specific device, instructing it to retard or advance its timing relative to the current uplink timing. The UE-specific TA command may be transmitted as a MAC control element on a downlink shared channel (DL-SCH). TA commands to a UE may be transmitted relatively infrequently (e.g., one or a few times per second), or may be transmitted on a more frequent basis, depending on how fast the UE is moving. As the target of TA is to keep the timing misalignment within the size of the cyclic prefix, the step size of the timing advance may be chosen as a fraction of the cyclic prefix. However, as 5G NR supports multiple numerologies with the cyclic prefix being shorter with the higher subcarrier spacing, the TA step size may be scaled in proportion to the cyclic prefix length and given by the subcarrier spacing of the active uplink bandwidth part.

For carrier aggregation, there may be multiple component carriers transmitted from a single device. In this case, the same TA value may be applied for all uplink component carriers. However, if different uplink carriers are received at different geographical locations, for example, by using remote radio heads for some carriers but not others, different carriers may require different TA values. For dual connectivity systems, different uplink carriers may be terminated at different sites. Accordingly, uplink carriers may be grouped into timing advanced groups (TAGs) and allow for different TA commands for different TAGs. In such a configuration, all component carriers in the same group may be subjected to the same TA command. The timing advance step size may be determined by the highest subcarrier spacing among the carriers in a timing advance group.

It is noted that some systems will send or specify an absolute TA value to be used by a UE for timing advance. In order to achieve timing alignment at both the gNB and the UE for a full duplex (FD) mode (e.g., simultaneous uplink transmissions and downlink transmissions in FR2 and/or other frequency bands), in some aspects a base station or gNB may be configured to indicate that a range of TA values could be allowed in the UE. In an example, the base station or gNB may be configured to provide a TA indication, such as through the use of a single bit field (e.g., a TA field in RACH random access response (RAR) or MAC-CE) that directs the UE to either apply the absolute TA value or the TA range of values. In some examples, the base station or gNB may be further configured to signal a particular TA range to the UE through RRC, MAC-CE, or DCI signaling, as just a few examples. In other examples, the range may be predefined such that the UE is configured to apply the predefined range when the TA indication indicate that application of a range of TA values is allowed in the UE. The TA range allows the base station or gNB side to deal with timing differentials that are less than the cyclic prefix), while still affording the UE the flexibility to adjust the TA value in consideration of the UE's timing differentials.

As used herein, the term FD mode may include SBFD in flexible TDD, but may also include FDD in paired spectrum, SBFD in unpaired spectrum, in-band full-duplex (IBFD), or other types of full-duplex operation. For IBFD communication, the UL time-frequency resources may completely overlap with a portion of the DL time-frequency resources in some examples. In other examples, the UL time-frequency resources may only partially overlap with a portion of the DL time-frequency resources. Accordingly, a device, for example a base station and/or a scheduled entity, employing IBFD may transmit and receive on the same time and frequency resources. That is, the device may transmit and receive at the same time(s) at the same frequency (or frequencies). The UL and DL may also share the same time and frequency resources. The overlap in time-frequency resources may be complete or partial.

Communication between a base station and a UE may involve transmission and reception of orthogonal frequency-division multiplexing (OFDM) symbols. A transmitted OFDM symbol may be subject to reflection and other channel-related influences resulting in some of the energy of the transmitted symbol taking different paths to a receiver (e.g., a receiver at the UE or the base station). These multipath components of the symbol result in interference at the receiver. This interference may be referred to as inter-symbol interference (ISI) since the energy of one OFDM symbol may interfere with reception of another OFDM symbol. The time differences between the arrival times of these multipath components at the receiver depends on the delay spread of the channel.

To mitigate such ISI, each OFDM symbol transmitted by a transmitter may be preceded by a cyclic prefix. In some examples, a cyclic prefix for a given OFDM symbol contains a repetition of information from the end of that OFDM symbol. If the cyclic prefix is at least as long as the delay spread, the multipath effects may be canceled out during the cyclic prefix. In this case, the receiver may be able effectively decode the OFDM symbol.

Figure 8:
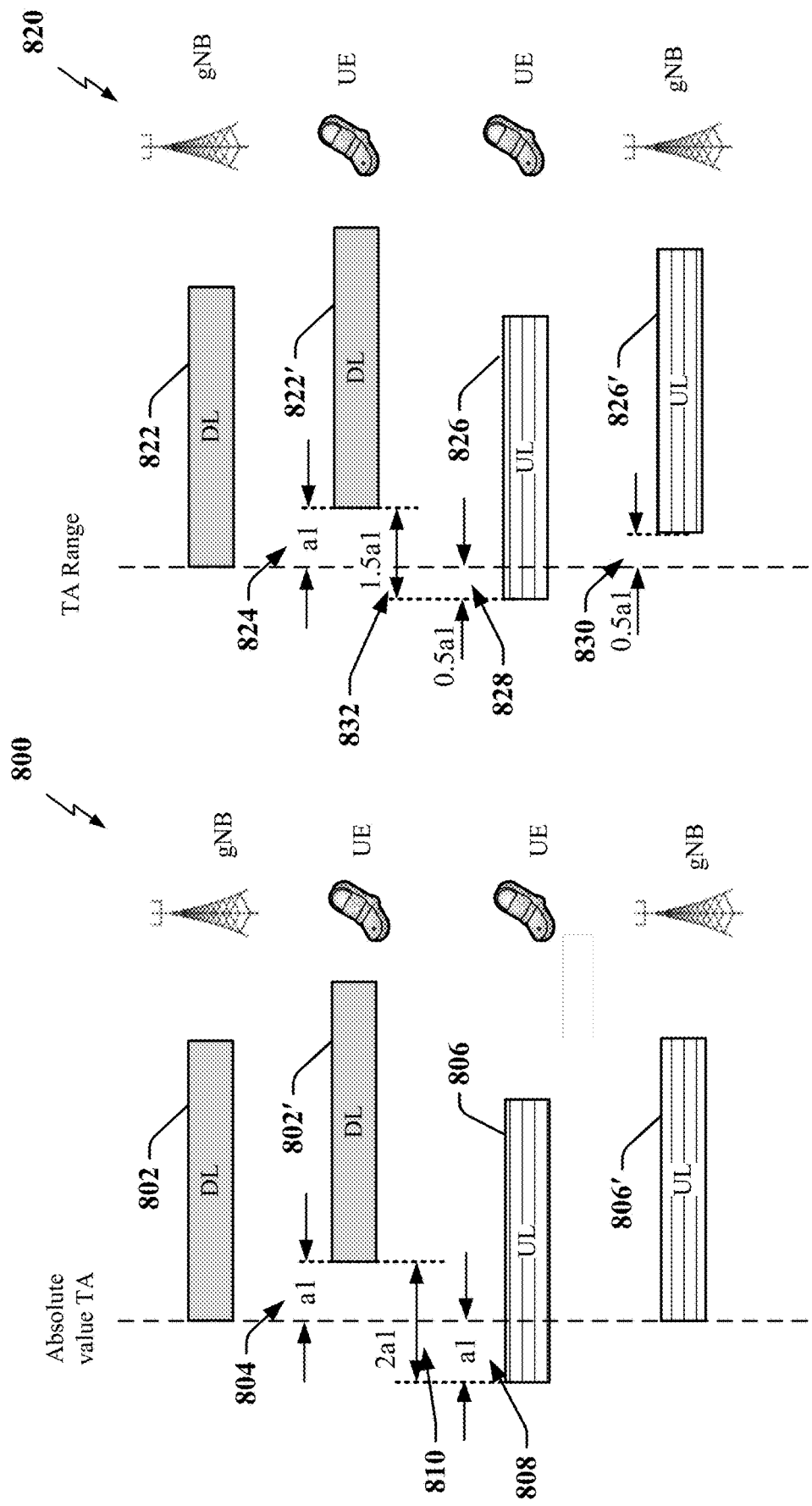
FIG. 8 illustrates timing diagrams showing the use of an absolute or fixed timing advance and a timing advance range according to some aspects.

FIG. 8 illustrates timing diagrams 800 and 820 showing the use of an absolute or fixed timing advance and a timing advance range according to some aspects. Timing diagram 800 illustrates the timing of DL and UL symbols for a system having a gNB and UE that is using a fixed TA value, which may have been indicated in the TA indication discussed above. In this case, a standard timing advance value (e.g., 2×a1 or "2a1") is used. This may be seen by the DL transmission 802 (e.g., symbol, subframe, slot, etc.) that is transmitted by a gNB. Similar to the example of FIG. 7, the propagation delay for the DL transmission 802 is a1 where the DL transmission 802 arrives at the UE after this time delay (e.g., as shown by DL transmission 802' arriving at the UE). At the UE, when transmitting in full-duplex mode, the UE transmits an UL transmission 806 at a timing advance of a1 808 such that the UL transmission 806 arrives at the gNB at the same time as the transmission of DL transmission 802 as indicated by UL transmission 806'. It is noted that the timing in timing diagram 800 is based on the assumption that the transmit and receive time is the same at the gNB side and the UE side, and therefore, the transmit to receive differential is 2×a1 or "2a1", which is the TA value.

Additionally, FIG. 8 illustrates a timing diagram 820 where the gNB or base station has configured the TA indication value (e.g., the one bit value discussed above) to indicate that a TA range is allowable. In this example, although not limited to such, a timing advance value of 0.5a1 is used (which may be determined by the UE without control by the gNB to decide this value), which is within a calculated or bounded range discussed in more detail below. The DL transmission 822 is transmitted by the gNB and the propagation delay for the DL transmission 822 is a1 where the DL transmission 822 arrives at the UE after this time delay (as shown by DL transmission 822' arriving at the UE). At the UE, when transmitting in full-duplex mode, the UE may also transmit the UL transmission 826 at a timing advance of 0.5×a1 at 828. In this case, since the transmission time or delay is a1, the UL transmission 826 arrives at the gNB at approximately 0.5a1 delay after the DL transmission 822 transmission time as indicated by UL transmission 826' and time delay 830.

In the example of timing diagram 820, on the gNB side, the transmit to receive differential is TA/4 or 0.5a1 (e.g., see 830), assuming a normal, legacy, or typical value of TA=2a1. At the UE side, the transmit to receive differential is 3/4TA or 1.5a1 as shown at 832. This example illustrates that when the TA range is indicated, the UE is provided flexibility for deciding the TA value within a particular bounded range.

Figure 9:
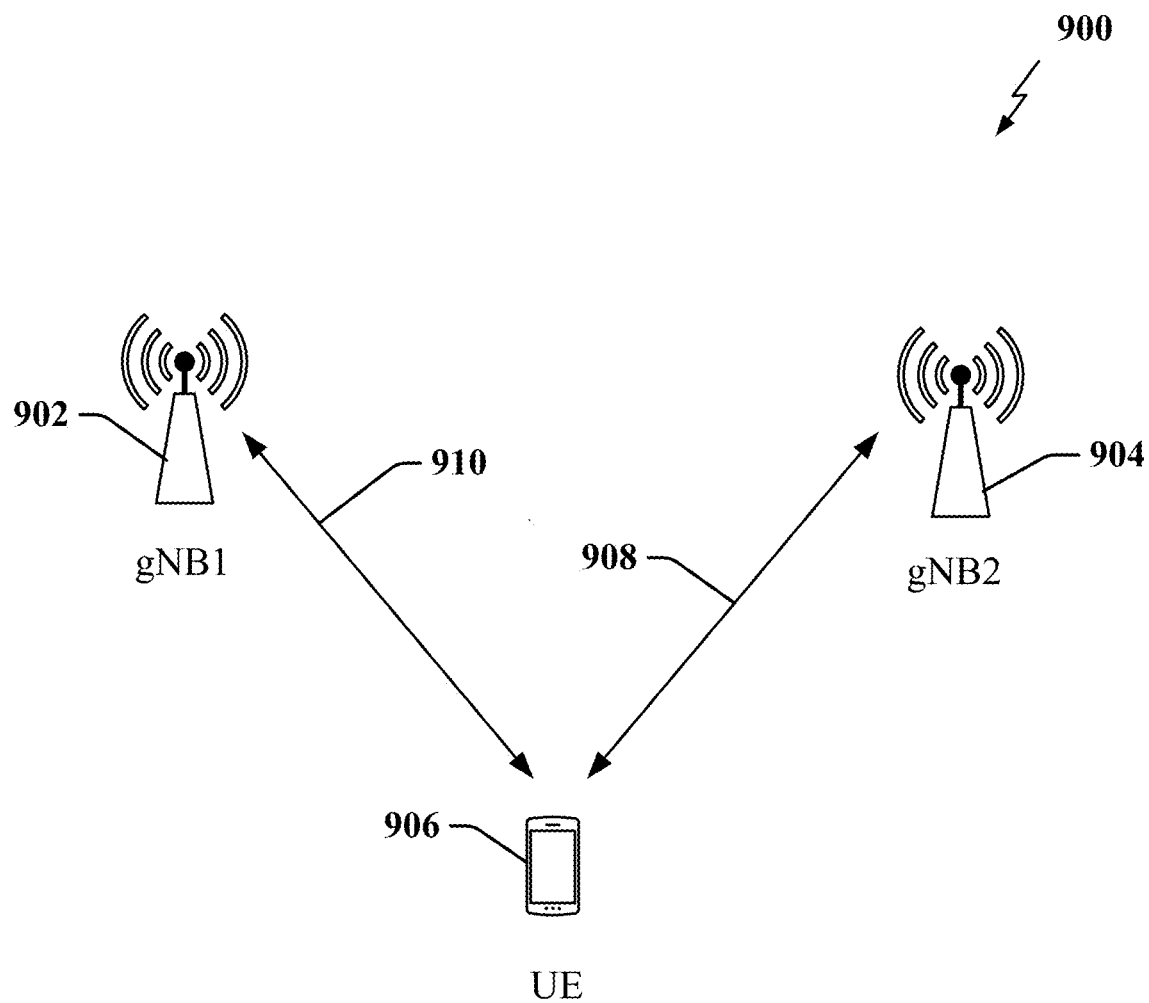
FIG. 9 illustrates a diagram of a wireless communication system utilizing multiple transmission and reception points in which the concepts disclosed herein may be applied according to some aspects.

FIG. 9 illustrates a diagram of a wireless communication system 900 utilizing multiple transmission and reception points in which the concepts disclosed herein may be applied according to some aspects. As illustrated, the wireless communication system 900 includes a first gNB 902, a second gNB 904 and at least one UE 906. In some cases, the first gNB 902 and the second gNB 904 may each be a different transmission reception point (TRP). In this wireless communication system, the UE 906 may communicate in simultaneous FD mode with both of the gNBs 902 and 904. For example, as shown at 908, the UE 906 may communicate transmissions (e.g., UL and/or DL transmissions) with the first gNB 902. Additionally, as shown at 910, the UE 906 may communicate transmissions (e.g., UL and/or DL transmissions) with the second gNB 904. It is noted that the determination of the timing advance within the ranges as discussed above may be used in the UE for the UL transmissions with both gNBs based on δ, which helps to determine a real range for a TA value.

Figure 10:
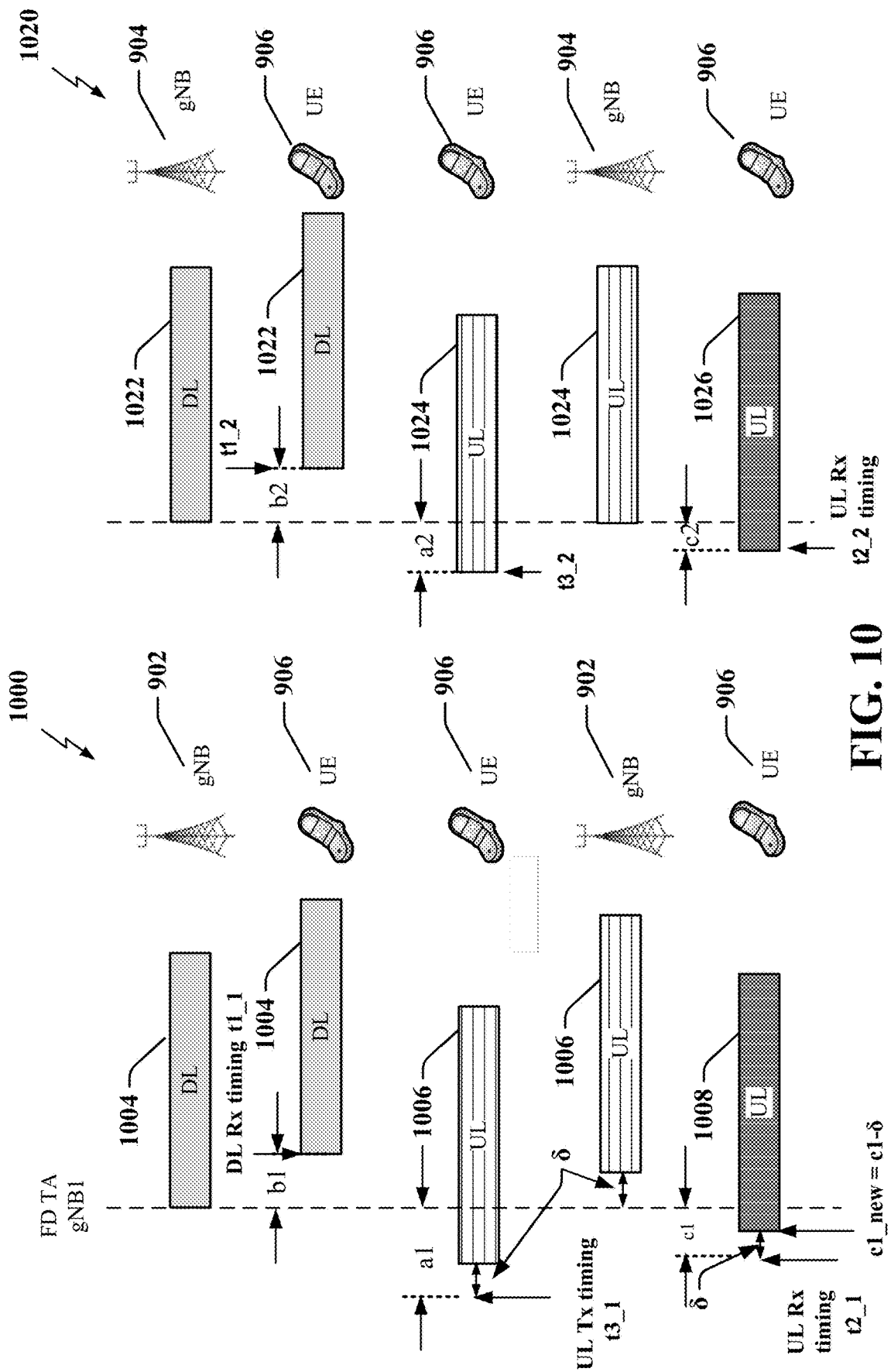
FIG. 10 illustrates time lines of FD transmissions according to some aspects.

FIG. 10 illustrates timelines 1000 and 1020 of FD transmissions in the wireless communication system of FIG. 10, for example. In particular, FIG. 10 illustrates further details concerning the delta (δ) value, particularly in a multi-TRP or gNB environment. In particular, timeline 1000 illustrates the timing of transmissions transmitted between the first gNB 902 and UE 906. The first gNB 902 transmits a DL transmission 1004, which then is received at the UE 906 at a downlink receive timing t1_1 after a propagation delay of b1.

On the UE side, an UL transmission 1006 transmitted from the UE 906 to the first gNB 902 is advanced in time by a time advance, a1, to an UL transmit timing of t3_1. In this case, however, the UL transmit timing may be delayed by the delta (δ) value to allow the UE 906 to wait the time of the delta (δ) value before transmitting UL transmission 1006. As shown further, UL transmission 1006 may arrive at the first gNB 902 at a time δ after the DL symbol transmit time.

Additionally, timeline 1000 shows an UL transmission 1008 for illustrating that the UE's UL transmission may be received on the UE's DL receive panel (which is self-interference (SI)). Here, a timing advance of c1 is advanced by the time δ following the UL transmission 1006 such that a new c1 (c1_new) is equal to the c1 value less the δ value. UL transmission 1008 thus illustrates a real receiver time at a DL receiving panel of the UE 906.

Timeline 1020 illustrates transmissions between a second gNB (e.g., second gNB 904) and the UE 906. As illustrated, the second gNB 904 transmits a DL transmission 1022, which is then received at the UE 906 at time t1_2 after a propagation delay of b2. The UE 906 transmits an UL transmission 1024 at a UL transmit time 3_2 with a timing advance of a2. The UL transmission 1024 is received at the second gNB 904 at a same time as the transmission of DL transmission 1022. Due to SI, for example, an UL transmission 1026 is illustrated to show the real UL receive timing at a DL receive panel of the UE 906 with an advance of c2. Again, the UE 906 is configured to set the delta value such that the difference between the downlink reception time (e.g., t1_2) and the uplink reception time (e.g., t2_1) at the UE 906 minus the delta value is less than CP length, indicating that the relationship Trx_dl_i−Trx_ul_j_new=Trx_dl_i−Trx_ul_j−delta=b2+c1−delta<CP remains true.

Figure 11:
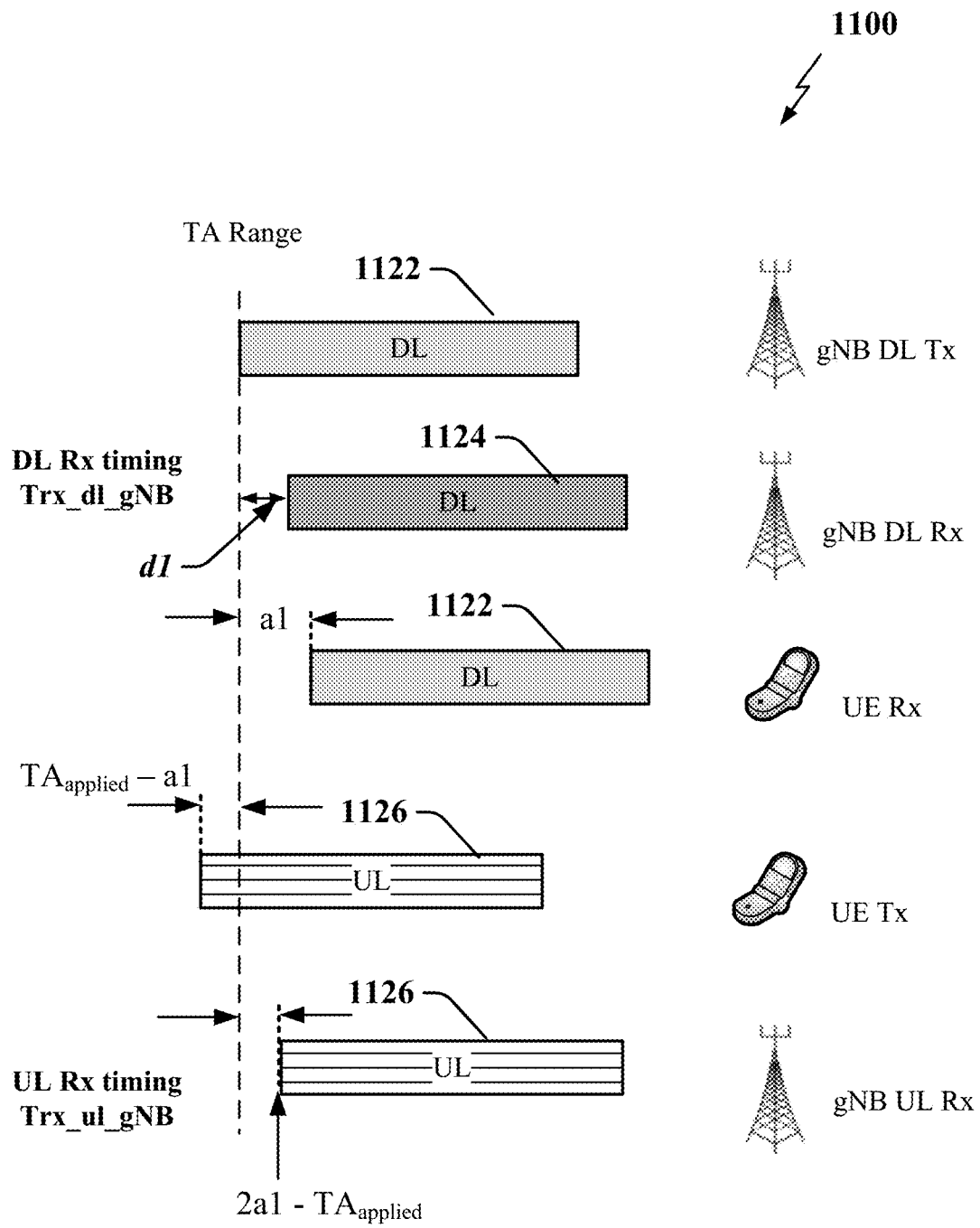
FIG. 11 illustrates another signal timeline illustrating the consideration of a gNB DL propagation delay to its UL beam according to some aspects.

FIG. 11 illustrates another signal timeline 1100 illustrating the consideration of a gNB DL propagation delay d1 to its UL beam (i.e., self-interference of the DL transmission on an UL receive beam of the gNB). In this example, a DL transmission transmitted to a UE is shown at 1122. On the UL Rx beam, however, the gNB may receive the DL transmission 1122 as illustrated by DL transmission 1124 which may include a gNB side propagation delay d1 as part of self-interference that may occur at the gNB. Additionally, the DL transmission 1122 is received at the UE.

On the UE side, an UL transmission 1126 may be transmitted by the UE at a timing advance of $TA_{applied}$−a1, where $TA_{applied}$ represents the timing advance value and a1 is the propagation delay. After a propagation delay of 2a1−$TA_{applied}$, the gNB receives the UL transmission 1126. In some examples, the application or compensation for the delay d1 may be accomplished according to the following relationships for non-delay spread (DS) systems (e.g., using equations 1-3) and for DS systems (e.g., using equations 4-6), respectively:

$$0 \leq 2a1 - TA_{applied} - d1 \leq CP \quad (1)$$

$$2a1 - CP - d1 \leq TA_{applied} \leq 2a1 - d1 \quad (2)$$

$$TA_{indicate} - CP - d1 \leq TA_{applied} \leq TA_{indicated} - d1 \quad (3)$$

(if $TA_{indicated}=2a1$); and $$0 \leq 2a1 - TA_{applied} - d1 \leq CP - DS \quad (4)$$

$$2a1 - CP - d1 + \leq TA_{applied} \leq 2a1 - d1 \quad (5)$$

$$TA_{indicate} - CP - d1 + DS \leq TA_{applied} \leq TA_{indicated} - d1 \quad (6)$$

(if $TA_{indicated}=2a1$).

Figure 12:
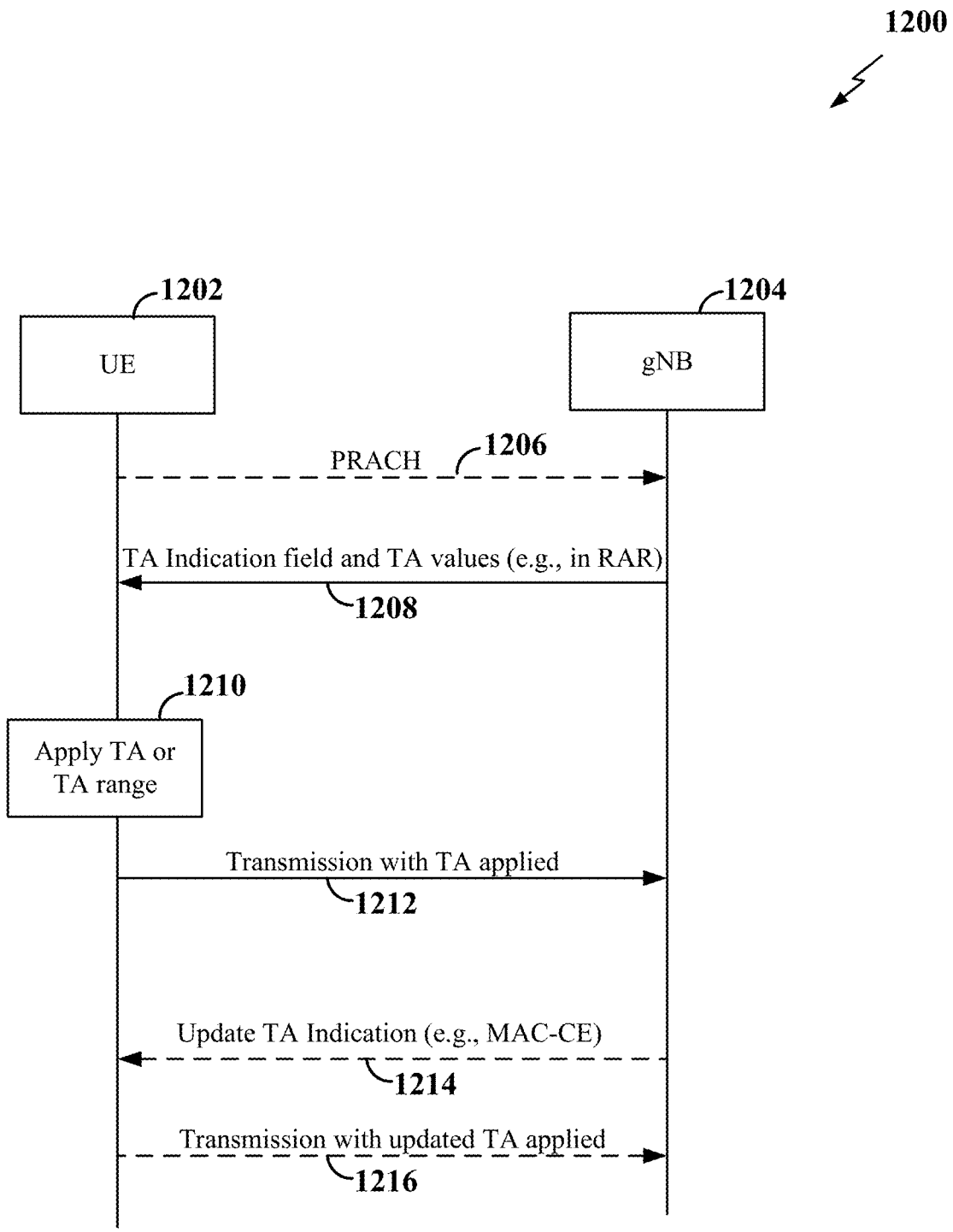
FIG. 12 is a call flow diagram of transmitted symbols in a communication system and the application of timing advance range according to some aspects.

FIG. 12 is a call flow diagram 1200 of transmissions in a communication system and the application of timing advance range according to some aspects. As illustrated, the call flow shown is between a UE 1202 and a gNB 1204, but is not limited to such and could be applied to a multi-TRP/multi-gNB system such as was shown in FIG. 10.

In the example of FIG. 12, initial access signaling or messaging such as a PRACH 1206 sent from the UE 1202 may be used by gNB 1204 to determine an initial TA to be used by the UE 1202. In aspects, the gNB 1204 may further determine a TA range based on the signaling from the UE 1202. After determination of the TA and whether a TA range may be used (i.e., thus establishing a state of the TA indication field, such as the bit state of a single bit to indicate whether or not the UE may apply a TA range or a TA absolute value, which may be a default value used in the communication system as discussed previously), the gNB 1204 transmits the TA indication and, in some examples, an indication of the TA (e.g., a $TA_{indicated}$) as shown at 1208. In some examples, this signaling of the TA indication may be transmitted by the gNB 1204 in a random access response (RAR) message.

Upon receipt of the TA indication at 1208, the UE 1202 may apply either a TA absolute value or a TA range for timing advance dependent on the TA indication value. Additionally, application of the TA range (e.g., determination of $TA_{applied}$) may include any of the processes discussed above in connection with FIGS. 8-11 including determination of the delta value and application of L1-SINR measurements for setting the delta value. When the TA to be applied is determined, the UE may commence transmission using the determined TA as is illustrated by the transmission at 1212.

In further aspects, the TA indication may be updated when network conditions change. Thus, when the gNB 1204 and/or the UE 1202 determine a change of the TA is required, the gNB 1204 may update the TA indication (and $TA_{indicated}$ value in some aspects) and send the updated indication (and $TA_{indicated}$, if so configured) as illustrated by at 1214. In some cases, the updated TA indication may be transmitted to the UE 1202 in a MAC-CE. In other examples, the TA value range may be sent or communicated by the gNB 1204 to the UE 1202 via RRC signaling or in a DCI message. In response to the updated TA indication, the UE 1202 may apply the updated timing advance (i.e., $TA_{applied}$) to one or more uplink transmissions as illustrated at 1216.

Aspects Related to Full Duplex Timing Advance Enhancements

In some cases, aspects of the present disclosure provide techniques that allow a UE in a wireless communication system to request an updated or new timing advance. For example, in some cases, a UE may measure a timing difference between a downlink signal and an uplink signal based on a received TA value in a TA signal. The UE may then transmit a timing report to a base station, indicating the timing difference. Thereafter, the UE may receive a new or updated TA value to allow the UE 1302. The new or updated TA value may allow the UE to compensate for the timing difference to better align UE-side DL and UL timing. Aligning the UE-side DL and UL timing may reduce the chances of interference and missed or un-decodable transmissions and, therefore, improves resource (e.g., time, frequency, power) usage at the UE and the base station in the wireless communication system.

Figure 13:
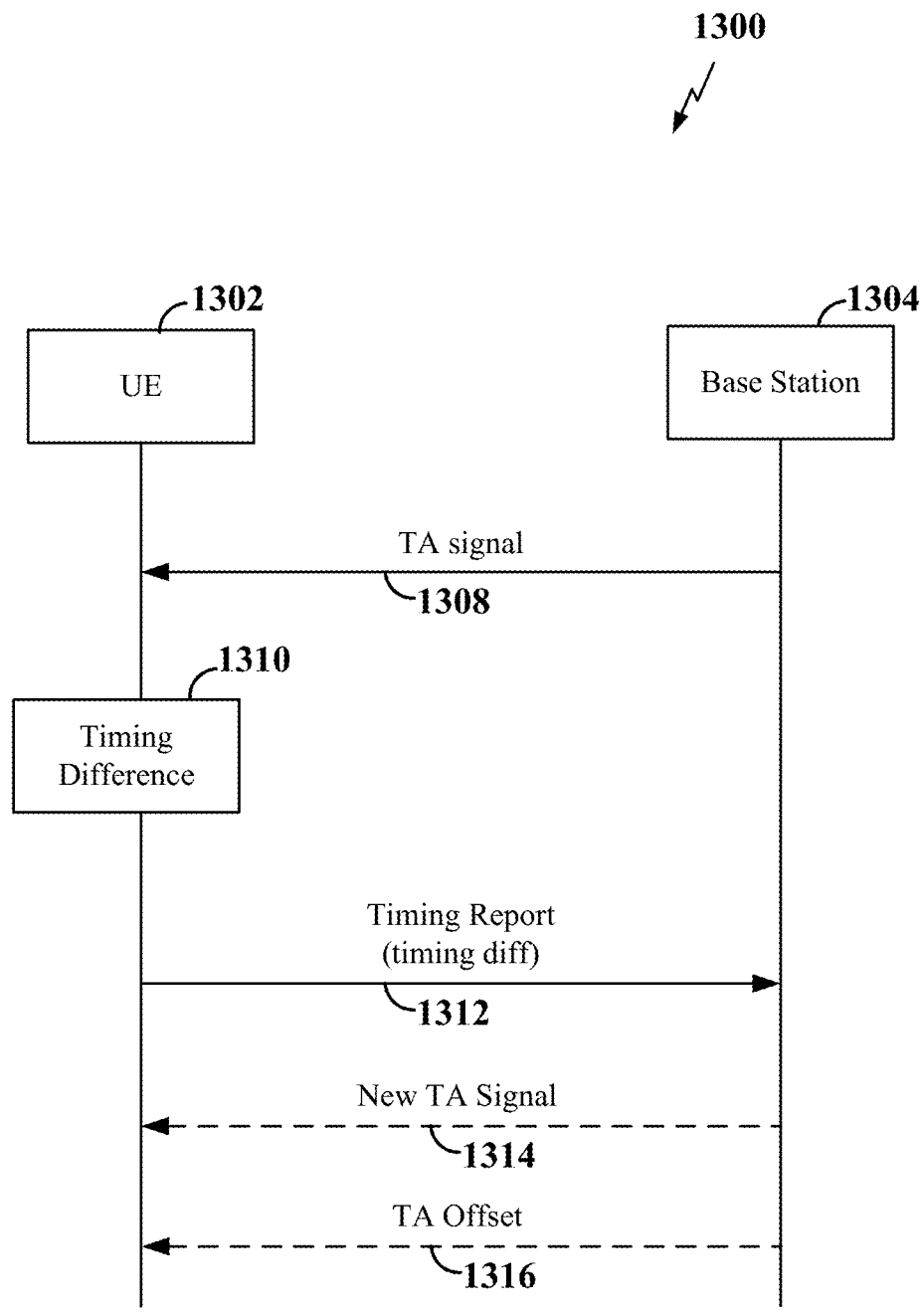
FIG. 13 shows an illustrative signaling diagram for a UE-requested TA signal according to some aspects.

FIG. 13 shows a call flow diagram 1300 illustrating operations for a UE-requested TA signal according to some aspects. The example of FIG. 13 may incorporate any of the aspects discussed above in connection with FIGS. 8-12. As illustrated, the operations in the call flow diagram 1300 are between a UE 1302 and a base station 1304 (e.g., gNB). However, these operations are not limited to only one base station and could be applied to a multi-TRP or multi-gNB system such as was shown in FIG. 10.

In this example, the UE 1302 receives a first TA signal at 1308 from the base station 1304. The first TA signal received by UE 1302 may be a TA signal that does not include a TA indication value (e.g., the one bit value discussed above in connection with FIG. 8), in order to force the UE to use a fixed TA value and to disallow the UE from using a TA range. In block 1310, the UE 1302 determines a timing difference between a downlink signal and an uplink signal based on the first TA signal received at 1308. In some cases, the timing difference may be between a start of a downlink slot and a start of an uplink slot. In some cases, the UE may determine the timing difference by measuring the timing difference between a first timing (t1) for the downlink signal and a second timing (t2) for the uplink signal. In some cases, the downlink signal comprises a received FD downlink transmission he uplink signal comprises a received FD uplink transmission at the UE (e.g., a self-interference signal/transmission where the UE receives its own UL transmission, transmitted using an UL beam of a transmit panel, via a DL beam of a receive panel).

The UE 1302 may also determine whether the time difference in within a threshold. Stated otherwise, the UE 1302 may determine if there are out-of-threshold timing difference present. The determination of an out-of-threshold timing difference may be based on a cyclic prefix (CP) or a value larger than the CP (e.g., 2×CP) that may be defined by the base station 1304. The UE 1302 may then transmit, to the base station 1304, a timing report at 1312 that may include the out-of-threshold timing difference. In other words, the timing report may indicate the measured timing difference that is not within the threshold. Thereafter, the base station 1304 may process the timing report and time differences to adjust the timing within the CP at the base station 1304, based, for example, on a delta TA value, x, where 0<x<CP or 0<x<(CP—downlink delay spread). If the base station 1304 still has timing room within CP after covering the delay spread, the base station 1304 may respond to the UE 1302 with a new or updated TA signal at 1314. In some cases, the new or updated TA signal may include a different (e.g., smaller) TA value to allow the UE 1302 to compensate for the measured timing difference. In some cases, the new or updated TA value may be transmitted by the base station 1304 in, for example, a MAC-CE.

In some examples, the base station 1304 may transmit a TA offset in 1316 that may include a variable compensation or corrective factor delta ($\delta$), which may be applied by the UE 1302 to the (original) TA value received in the first TA signal, resulting in a smaller TA value than the original TA value received at 1308. In some cases, the resulting smaller TA value may be bounded between zero and the value of the CP or between zero and the value of the CP minus DL delay spread. In some cases, the variable compensation factor ($\delta$) may be based on the relationship: t1−t2−$\delta$<CP, where CP is a cyclic prefix and t1 and t2 are discussed above.

In some cases, the new or updated TA signal received at 1314 and/or TA offset received at 1316 may be configured specific to the UE 1302, but may also be configured for an active DL and UL FD beam pair of the UE, or an active transmission configuration index (TCI) state, a UE panel identifier (ID), or a UE beam group, to better align UE-side DL and UL timing. In other words, the new or updated TA signal received at 1314 and/or TA offset received at 1316 may be associated with at least one of an active beam pair link, an active TCI state, a UE panel ID, or a beam group.

Figure 14:
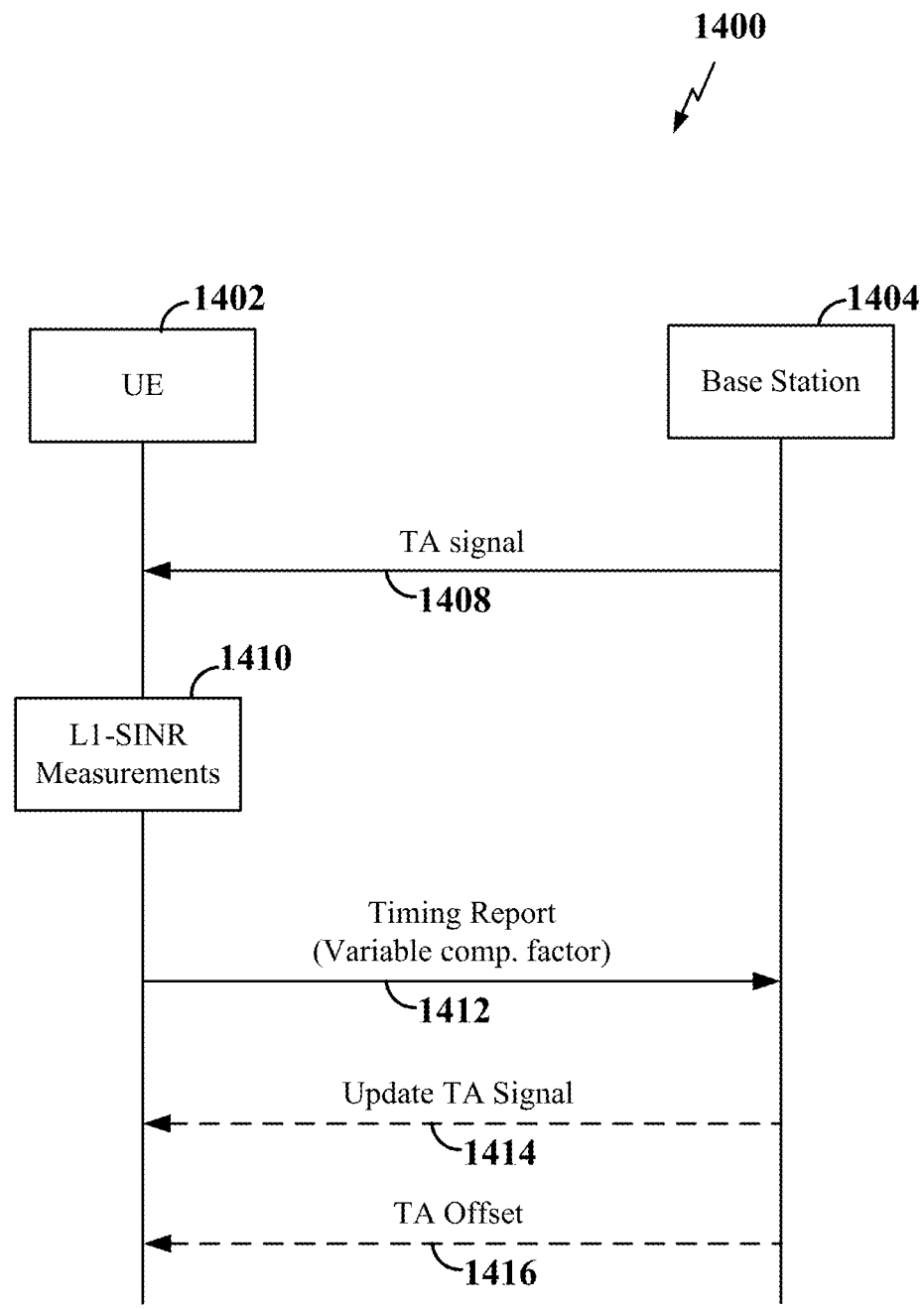
FIG. 14 shows an illustrative signaling diagram for a UE-requested TA signal using a compensation factor according to some aspects.

FIG. 14 shows a call flow diagram 1400 illustrating example operations for a UE-requested TA signal using a compensation factor according to some aspects. The example of FIG. 14 is similar to the example of FIG. 13, where the operations are between a UE 1402 and a base station 1404 (e.g., gNB). However, as with FIG. 13, these operations are not limited to only one base station and could be applied to a multi-TRP or multi-gNB system such as was shown in FIG. 10.

In this example, the UE 1402 receives a first TA signal in 1408 from the base station 1404. The first TA signal received by UE 1402 may be a TA signal that does not include a TA indication value (e.g., the one bit value discussed above in connection with FIG. 8), in order to force the UE to use a fixed TA value and to disallow the UE from using a TA range. In block 1410, the UE 1402 performs channel quality measurements (e.g., layer 1 signal to interference plus noise ratio (L1-SINR) measurements) to determine one or more signal quality metrics, which may then be used by the UE 1402 to determine a variable compensation factor ($\delta$ value). In some cases, the L1-SINR measurements may be performed on channel measurement resources (CMRs) and self-interference measurement resources (SIMRs) per one of a transmit/receive beam pair, a bi-directional transmission configuration index (TCI) state, a UE panel, a UE beam group or a UE.

The UE 1042 may be configured to determine the variable compensation factor by using the L1-SINR measurements to measure the reception times of the downlink (e.g. channel state information reference signals (CSI-RSs)) and uplink (e.g. sounding reference signals (SRSs)) signals. In an example, the UE may be configured to select a variable compensation factor $\delta$ value according to the following criteria: $Trx\_dl\_i - Trx\_ul\_j\_new = Trx\_dl\_i - Trx\_ul\_j + \delta < CP$, where $Trx\_dl\_i$ is the reception time on the downlink from a "$i^{th}$" node (e.g., an ith transmission and reception point (TRP)), $Trx\_ul\_j$ is the reception time on the uplink for a "$j^{th}$" node (e.g., a jth transmission and reception point (TRP)), and $Trx\_ul\_j\_new = Trx\_ul\_j - \delta$. In some cases, $Trx\_dl\_i - Trx\_ul\_j - \delta < CP$ may be rewritten as follows: $t1 - t2 - \delta < CP$, where $t1 = Trx\_dl\_i$ and $t2 = Trx\_ul\_j$.

The UE 1402 may select a variable compensation factor ("delta") to apply that satisfies the above criteria. In one example, L1-SINR measurements may utilize CSI-RS with multiple beam sweeps, and SRS to determine the SINR. Additionally, it is noted that if the variable compensation factor $\delta$ is close to the value of $Trx\_dl\_i - Trx\_ul\_j$, this may minimize the timing differentials and, therefore, improve alignment between UL and DL. Also, with a particular range for $\delta$ as discussed above, this also serves to relax the criteria at UE 1402. Based on the L1-SNR measurements, the reported variable compensation factor could be determined per the UE 1402, and may also be determined per DL and UL beam pair, bi-directional TCI state, UE panel or UE beam group. In some examples, the variable compensation factor determined from the L1-SINR measurements may be reported with a UE panel ID.

The UE 1402 may then transmit a timing report at 1412 that may include the suggested variable compensation factor to the base station 1404. The base station 1404 may process the variable compensation factor to adjust the timing within the CP at the base station 1404 as discussed above. Thereafter, the base station 1404 may respond to the UE 1402 with a new or updated TA signal 1414. In some cases, the new or updated TA signal may include a different (e.g., smaller) TA value to allow the UE 1402 to compensate for the measured timing difference. In some cases, the new or updated TA value may be transmitted by the base station 1404 in, for example, a MAC-CE.

In some examples, the base station 1404 may transmit a TA offset in 1416 that may include a compensation or corrective factor delta (δ), which may be applied by the UE 1402 to the (original) TA value received in the first TA signal, resulting in a smaller TA value than the original TA value received at 1408. In some cases, the resulting smaller TA value may be bounded between zero and the value of the CP or between zero and the value of the CP minus DL delay spread. In some cases, the new or updated TA signal received at 1414 and/or TA offset received at 1416 may be configured specific to the UE 1402, but may also be configured for an active DL and UL FD beam pair of the UE, or an active transmission configuration index (TCI) state, a UE panel identifier (ID), or a UE beam group, to better align UE-side DL and UL timing. In other words, the new or updated TA signal received at 1414 and/or TA offset received at 1416 may be associated with at least one of an active beam pair link, an active TCI state, a UE panel ID, or a beam group. In some example, the timing reports of FIGS. 14 and 15 may be combined, such that a UE may transmit a timing report at 1412 that includes both the timing difference and variable compensation factor.

Figure 15:
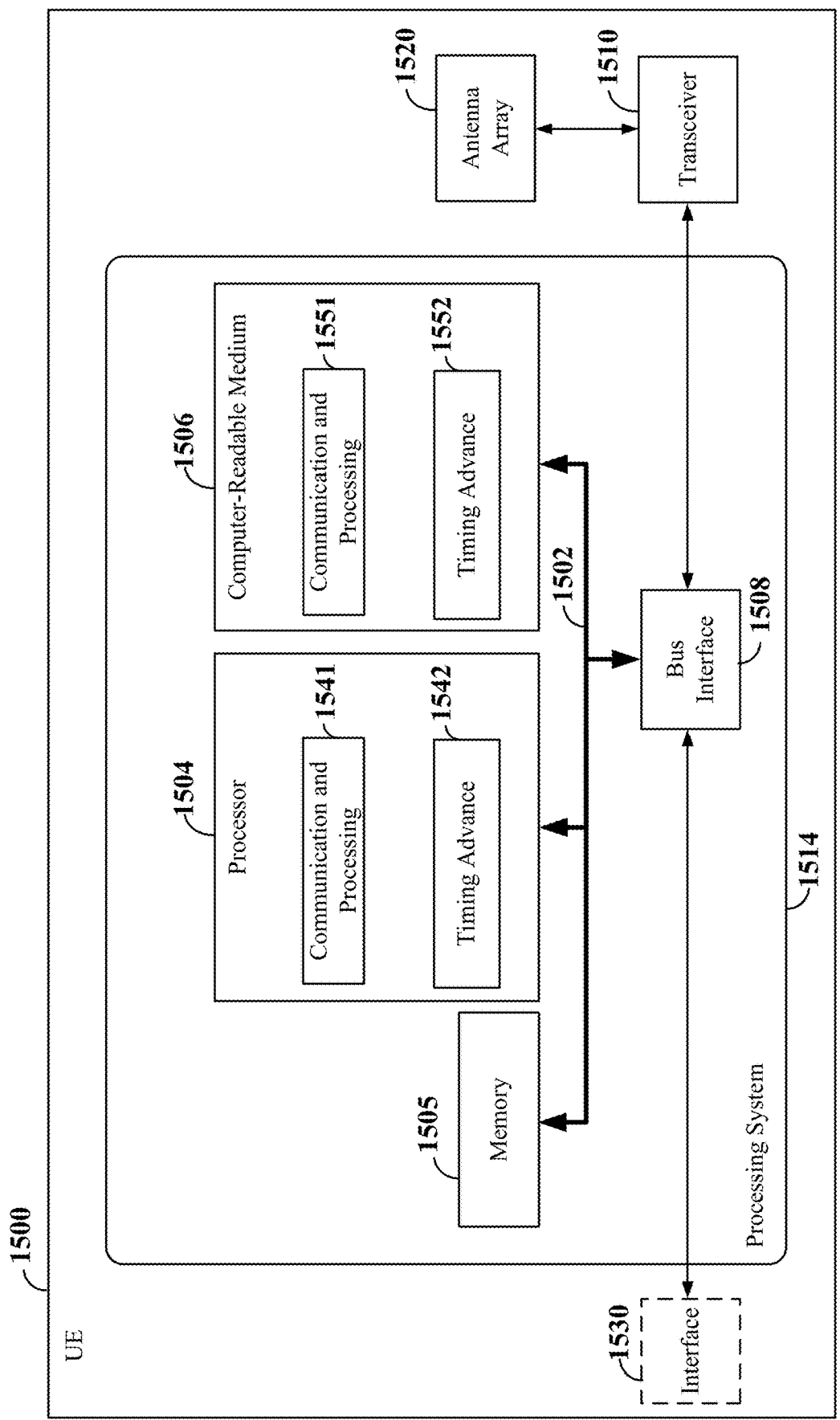
FIG. 15 is a block diagram illustrating an example of a hardware implementation for a UE employing a processing system according to some aspects.

FIG. 15 is a block diagram illustrating an example of a hardware implementation for a UE 1500 employing a processing system 1514. For example, the UE 1500 may be a user equipment (UE) or other device configured to wirelessly communicate with a base station, as discussed in any one or more of FIGS. 1-14. In some implementations, the UE 1500 may correspond to any of the UEs or scheduled entities shown in FIGS. 1, 2, 4, 5, and/or 7-14.

In accordance with various aspects of the disclosure, an element, or any portion of an element, or any combination of elements may be implemented with the processing system 1514. The processing system 1514 may include one or more processors 1504. Examples of processors 1504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1500 may be configured to perform any one or more of the functions described herein. That is, the processor 1504, as utilized in a UE 1500, may be used to implement any one or more of the processes and procedures described herein.

The processor 1504 may in some instances be implemented via a baseband or modem chip and in other implementations, the processor 1504 may itself comprise a number of devices distinct and different from a baseband or modem chip (e.g., in such scenarios as may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1514 may be implemented with a bus architecture, represented generally by the bus 1502. The bus 1502 may include any number of interconnecting buses and bridges depending on the specific application of the processing system 1514 and the overall design constraints. The bus 1502 communicatively couples together various circuits including one or more processors (represented generally by the processor 1504), a memory 1505, and computer-readable media (represented generally by the computer-readable medium 1506). The bus 1502 may also link various other circuits such as timing sources, peripherals, voltage regulators, and power management circuits, which are well known in the art, and therefore, will not be described any further. A bus interface 1508 provides an interface between the bus 1502 and a transceiver 1510. The transceiver 1510 provides a communication interface or means for communicating with various other apparatus over a wireless transmission medium.

The processor 1504 is responsible for managing the bus 1502 and general processing, including the execution of software stored on the computer-readable medium 1506. The software, when executed by the processor 1504, causes the processing system 1514 to perform the various functions described below for any particular apparatus. The computer-readable medium 1506 and the memory 1505 may also be used for storing data that is manipulated by the processor 1504 when executing software.

One or more processors 1504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1506.

The computer-readable medium 1506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1506 may reside in the processing system 1514, external to the processing system 1514, or distributed across multiple entities including the processing system 1514. The computer-readable medium 1506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1500 may be configured to perform any one or more of the operations described herein. In some aspects of the disclosure, the processor 1504, as utilized in the UE 1500, may include circuitry configured for various functions.

The processor 1504 may include communication and processing circuitry 1541. The communication and processing circuitry 1541 may be configured to communicate with a base station, such as a gNB. The communication and processing circuitry 1541 may include one or more hardware components that provide the physical structure that performs various processes related to wireless communication (e.g., signal reception and/or signal transmission) as described herein. The communication and processing circuitry 1541 may further include one or more hardware components that provide the physical structure that performs various processes related to signal processing (e.g., processing a received signal and/or processing a signal for transmission) as described herein. In some examples, the communication and processing circuitry 1541 may include two or more transmit/receive chains, each configured to process signals in a different RAT (or RAN) type. The communication and processing circuitry 1541 may further be configured to execute communication and processing software 1551 included on the computer-readable medium 1506 as a means for implementing one or more functions described herein.

In some examples, the communication and processing circuitry 1541 may be configured to receive and process downlink beamformed signals at an mmWave frequency or a sub-6 GHz frequency via the transceiver 1510 and an antenna array 1520. For example, the communication and processing circuitry 1541 may be configured to receive a respective reference signal (e.g., SSB or CSI-RS) on each of a plurality of downlink beams from the base station during a downlink beam sweep via at least one first antenna panel of the antenna array 1820. The communication and processing circuitry 1541 may further be configured to transmit a beam measurement report to the base station.

In some examples, the communication and processing circuitry 1541 may further be configured to generate and transmit uplink beamformed signals at an mmWave frequency or a sub-6 GHz frequency via the transceiver 1510 and the antenna array 1520. For example, the communication and processing circuitry 1541 may be configured to transmit a respective reference signal (e.g., SRS or DMRS) on each of a plurality of uplink beams to the base station during an uplink beam sweep via at least one second antenna panel of the antenna array 1520.

In some implementations where the communication involves receiving information, the communication and processing circuitry 1541 may obtain information from a component of the UE 1500 (e.g., from the transceiver 1510 that receives the information via radio frequency signaling or some other type of signaling suitable for the applicable communication medium), process (e.g., decode) the information, and output the processed information. For example, the communication and processing circuitry 1541 may output the information to another component of the processor 1504, to the memory 1505, or to the bus interface 1508. In some examples, the communication and processing circuitry 1541 may receive one or more of signals, messages, other information, or any combination thereof. In some examples, the communication and processing circuitry 1541 may receive information via one or more channels. In some examples, the communication and processing circuitry 1541 may include functionality for a means for receiving.

In some implementations where the communication involves sending (e.g., transmitting) information, the communication and processing circuitry 1541 may obtain information (e.g., from another component of the processor 1504, the memory 1505, or the bus interface 1508), process (e.g., encode) the information, and output the processed information. For example, the communication and processing circuitry 1541 may output the information to the transceiver 1510 (e.g., that transmits the information via radio frequency signaling or some other type of signaling suitable for the applicable communication medium). In some examples, the communication and processing circuitry 1541 may send one or more of signals, messages, other information, or any combination thereof. In some examples, the communication and processing circuitry 1541 may send information via one or more channels. In some examples, the communication and processing circuitry 1541 may include functionality for a means for sending (e.g., means for transmitting).

The processor 1504 may include timing advance circuitry 1542 that may be configured to operate with the communication and processing circuitry 1541 to process timing advance signals to synchronize full duplex and/or flexible duplex uplink and downlink channels, as described above in connection with FIGS. 10-14. In some implementations, timing advance circuitry 1542 and/or communication and processing circuitry 1541 may be configured to execute channel quality measurements to determine one or more signal quality metrics, such as SINR of a beam measurement for full duplex and/or flexible duplex communications, and to determine timing differences from TA values or ranges received from the base station. Timing advance circuitry 1542 may also be configured to generate one or more timing reports based on timing differences and transmit the timing report via transceiver 1510 to receive one or more timing advance indication signal for FD communication. The timing advance circuitry 1542 may also be configured to apply TA values, ranges and/or TA indication signals to the UE 1500 for communication. The timing advance circuitry 1542 may further be configured to execute timing advance software 1552 included on the computer-readable medium 1506 as a means for implementing one or more functions described herein.

Figure 16:
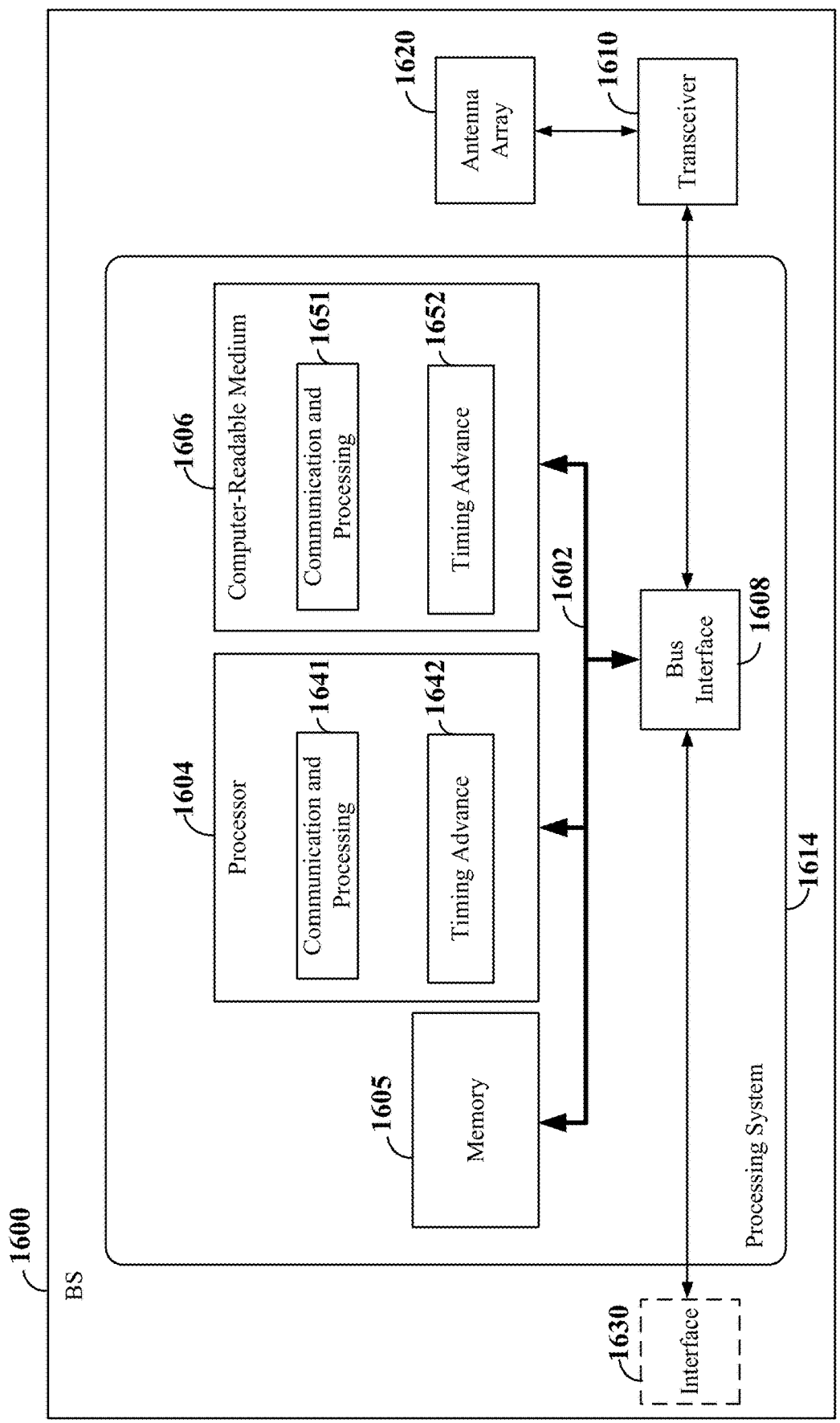
FIG. 16 is a conceptual diagram illustrating an example of a hardware implementation for base station (BS) employing a processing system according to some aspects.

FIG. 16 is a conceptual diagram illustrating an example of a hardware implementation for base station (BS) 1600 employing a processing system 1614. In some implementations, the BS 1600 may correspond to any of the BSs (e.g., gNBs) or scheduling entities shown in FIGS. 1, 2, 4, 5, and/or 7-14.

In accordance with various aspects of the disclosure, an element, or any portion of an element, or any combination of elements may be implemented with the processing system 1614. The processing system may include one or more processors 1604. The processing system 1614 may be substantially the same as the processing system 1614 illustrated in FIG. 16, including a bus interface 1608, a bus 1602, memory 1605, a processor 1604, and a computer-readable medium 1606.

The BS 1600 may be configured to perform any one or more of the operations described herein. In some aspects of the disclosure, the processor 1604, as utilized in the BS 1600, may include circuitry configured for various functions.

In some aspects of the disclosure, the processor 1604 may include communication and processing circuitry 1641. The communication and processing circuitry 1641 may be configured to communicate with a UE (e.g., 1600). The communication and processing circuitry 1641 may include one or more hardware components that provide the physical structure and means that performs various processes related to communication (e.g., signal reception and/or signal transmission) as described herein. The communication and processing circuitry 1641 may further include one or more hardware components that provide the physical structure that performs various processes related to signal processing (e.g., processing a received signal and/or processing a signal for transmission) as described herein. The communication and processing circuitry 1641 may further be configured to execute communication and processing software 1651 included on the computer-readable medium 1606 to implement one or more functions described herein.

In some examples, the communication and processing circuitry 1641 may be configured to generate, schedule, and modify a resource assignment or grant of time-frequency resources (e.g., a set of one or more resource elements). For example, the processor 1604 may schedule time-frequency resources within a plurality of time division duplex (TDD) and/or frequency division duplex (FDD) subframes, slots, and/or mini-slots to carry user data traffic and/or control information to and/or from multiple UEs. The communication and processing circuitry 1641 may be further configured to perform UL/DL communication using beamformed signals.

The communication and processing circuitry 1641 may further be configured to receive an uplink signal on one or more uplink receive beams via one or more uplink transmit beams applied to the uplink signal. For example, the communication and processing circuitry 1641 may be configured to receive the uplink signal on one or more uplink receive beams via at least one second antenna panel of the antenna array 1620. The uplink signal may include, for example, a PUCCH, PUSCH, SRS, DMRS, or PRACH.

In some implementations where the communication involves receiving information, the communication and processing circuitry 1641 may obtain information from a component of the BS 1600 (e.g., from the transceiver 1610 that receives the information via radio frequency signaling or some other type of signaling suitable for the applicable communication medium), process (e.g., decode) the information, and output the processed information. For example, the communication and processing circuitry 1641 may output the information to another component of the processor 1604, to the memory 1605, or to the bus interface 1608. In some examples, the communication and processing circuitry 1641 may receive one or more of signals, messages, other information, or any combination thereof. In some examples, the communication and processing circuitry 1641 may receive information via one or more channels. In some examples, the communication and processing circuitry 1641 may include functionality for a means for receiving.

In some implementations where the communication involves sending (e.g., transmitting) information, the communication and processing circuitry 1641 may obtain information (e.g., from another component of the processor 1604, the memory 1605, or the bus interface 1608), process (e.g., encode) the information, and output the processed information. For example, the communication and processing circuitry 1641 may output the information to the transceiver 1610 (e.g., that transmits the information via radio frequency signaling or some other type of signaling suitable for the applicable communication medium). In some examples, the communication and processing circuitry 1641 may send one or more of signals, messages, other information, or any combination thereof. In some examples, the communication and processing circuitry 1641 may send information via one or more channels. In some examples, the communication and processing circuitry 1641 may include functionality for a means for sending (e.g., means for transmitting).

The processor 1604 may include timing advance circuitry 1642 that may operate in conjunction with the communication and processing circuitry 1641 to transmit timing advance signals and timing advance indication signals to the UE. The timing advance circuitry 1642 may be configured to process timing reports received from the UE that may indicate a timing difference for a downlink signal and an uplink signal based on a previous timing advance signal transmitted from the BS, and transmit a timing advance indication signal to the UE for FD communication based on the received timing report. The timing advance indication signal may include a second, updated timing advance signal that may be different from an earlier timing advance signal, or may include a variable compensation factor, as described above. In some examples, the variable compensation factor $\delta$ may be based on measurement of a timing difference between a first timing t1 for a received FD downlink transmission and a second timing t2 for a FD uplink transmission, wherein the variable compensation factor $\delta$ is determined according to the relationship: $t1-t2-\delta<CP$, where CP is a cyclic prefix.

In some examples, the timing advance circuitry 1642 may be configured to adjust a cyclic prefix value prior to transmitting a second timing advance signal. The second timing advance signal may be transmitted (e.g., via transceiver 1610) on one of an active beam pair link, an active transmission configuration index (TCI) state link, a panel identification link, or a beam group link. The timing advance circuitry 1642 may further be configured to execute timing advance software 1652 included on the computer-readable medium 1606 to implement one or more functions described herein.

Figure 17:
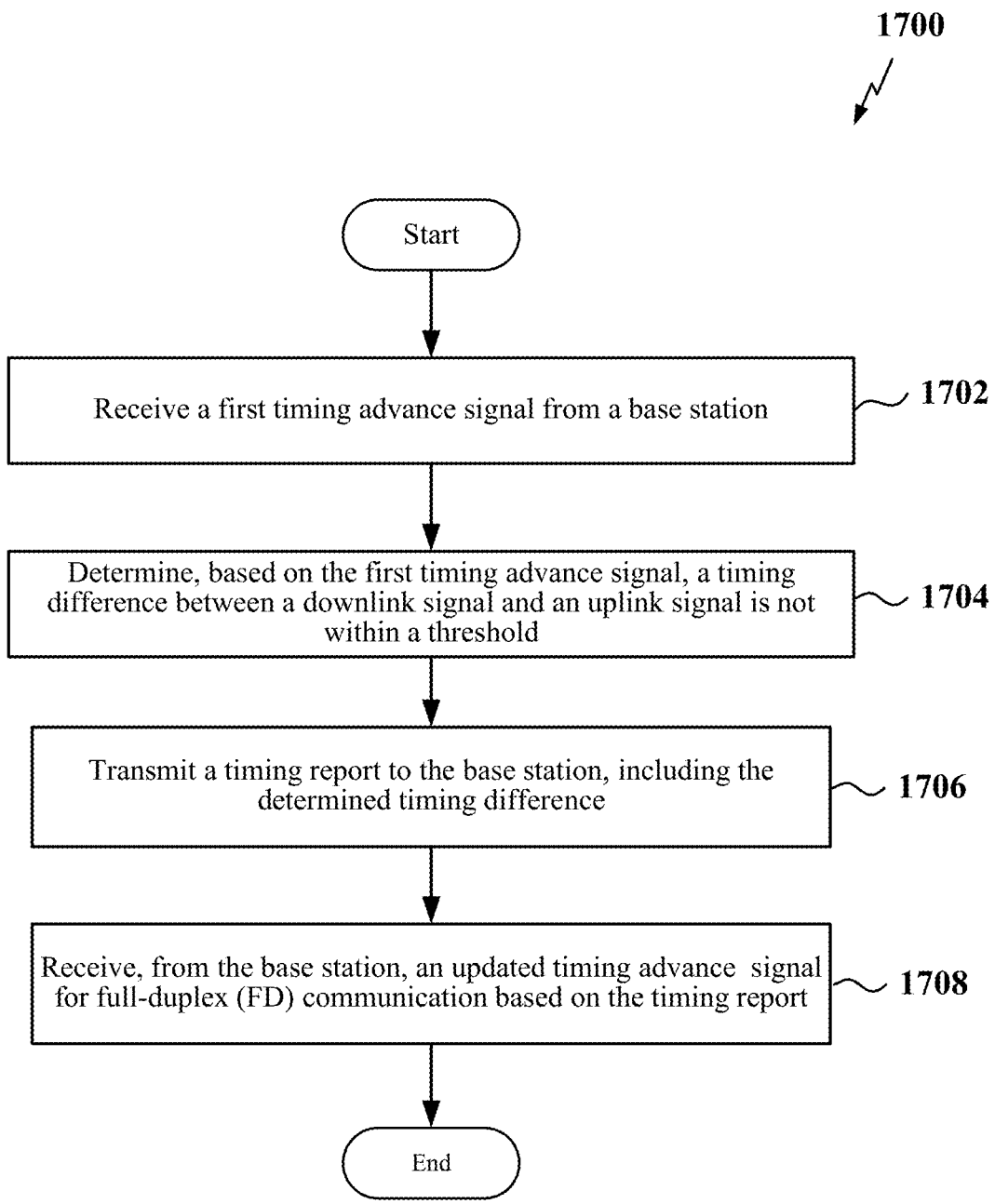
FIG. 17 is a flow chart illustrating an example process of full duplex (FD) communication at a UE using a timing advance indication signal according to some aspects.

FIG. 17 is a flow chart illustrating an example process 1700 of full duplex (FD) communication at a UE using a timing advance indication signal according to some aspects. As described below, some or all illustrated features may be omitted in a particular implementation within the scope of the present disclosure, and some illustrated features may not be required for implementation of all examples. In some examples, the process 1700 may be carried out by the UE 1500 illustrated in FIG. 15, by a processor or processing system, or by any suitable means for carrying out the described functions.

In block 1702, the UE receives a first timing advance signal. In block 1704, the UE determines, based on the first timing advance signal, a timing difference between a downlink signal and an uplink signal is not within a threshold. For example, the timing advance circuitry 1542 shown and described above in connection with FIG. 15 may provide a means to determine the timing difference and that the timing difference is not within the threshold. In some cases, the threshold comprises a cyclic prefix value. In some cases, the threshold comprises a cyclic prefix value minus a DL delay spread value.

In block 1706, the UE transmits a timing report to the base station, including the determined timing difference. In some examples, the timing report may be transmitted in a random-access response (RAR), or a media access control (MAC) control element (MAC-CE).

In block 1708, the UE receives, from the base station, an updated timing advance indication signal for full-duplex (FD) communication based on the timing report. In some cases, the updated timing advance signal comprises a second timing advance signal that is different from the first timing advance signal. In some cases, the second timing advance signal has a shorter timing offset than the first timing advance signal. In some cases, the updated timing advance signal is associated with at least one of an active beam pair link, an active transmission configuration index (TCI) state, a panel identifier, or a beam group Further, in some cases, the updated timing advance signal comprises a variable compensation factor ($\delta$). In some cases, the variable compensation factor ($\delta$) is based on the timing report. For example, in some cases, determining the timing difference in block 1702 may include measuring the timing difference between a first timing (t1) for the downlink signal and a second timing (t2) for the uplink signal. In some cases, the downlink signal comprises a received FD downlink transmission and the uplink signal comprises a received FD uplink transmission at the UE. In such cases, the variable compensation factor (δ) may be based on the relationship: t1−t2−δ<CP, where CP is a cyclic prefix.

In some cases, process 1700 may further include adjusting a start of an uplink slot for FD communication using the variable compensation factor (δ). For example, in some cases, the UE may apply an updated timing adjustment (TA) value indicated in the timing advance signal to an original timing advance value included in the first timing advance signal.

Figure 18:
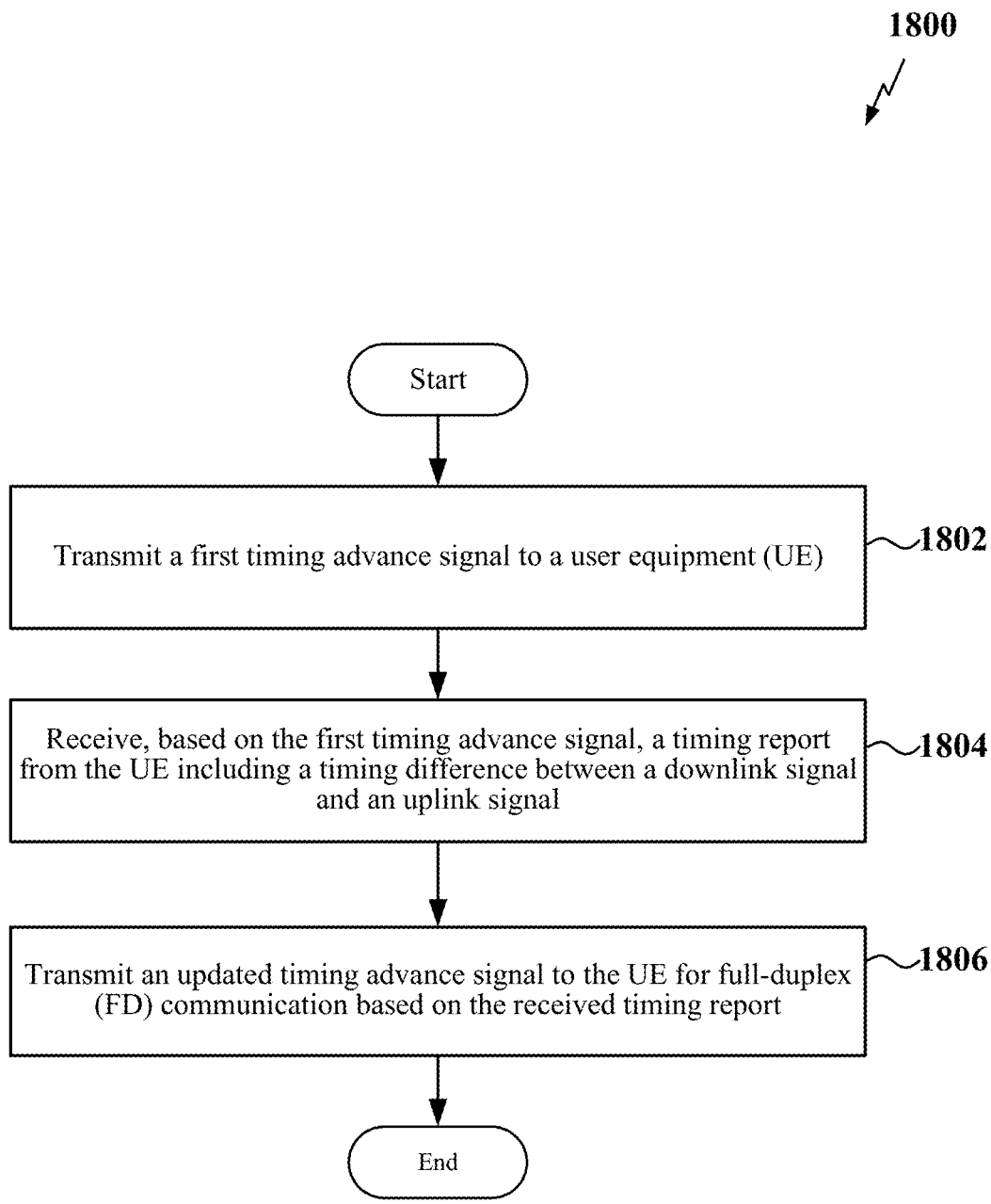
FIG. 18 is a flow chart illustrating an example process of FD communication at a base station using a timing advance indication signal according to some aspects.

FIG. 18 is a flow chart illustrating an example process 1800 of full duplex (FD) communication at a base station using a timing advance indication signal according to some aspects. As described below, some or all illustrated features may be omitted in a particular implementation within the scope of the present disclosure, and some illustrated features may not be required for implementation of all examples. In some examples, the process 1800 may be carried out by the BS 1600 illustrated in FIG. 16, by a processor or processing system, or by any suitable means for carrying out the described functions.

In block 1802, the base station transmits a first timing advance signal to a user equipment (UE).

In block 1804, the base station receives, based on the first timing advance signal, a timing report from the UE including a timing difference between a downlink signal and an uplink signal. For example, the timing advance circuitry 1642 shown and described above in connection with FIG. 16 may provide a means for receiving and processing the timing report.

In block 1806, the base station may transmits an updated timing advance signal to the UE for full-duplex (FD) communication based on the received timing report. In some examples, the timing advance indication signal may be transmitted in a random-access response (RAR), or a media access control (MAC) control element (MAC-CE). In some cases, the updated timing advance signal is associated with at least one of an active beam pair link, an active transmission configuration index (TCI) state, a panel identifier, or a beam group.

In some cases, the updated timing advance signal comprises a second timing advance signal that is different from the first timing advance signal. In some cases, the second timing advance signal has a shorter timing offset from the first timing advance signal.

Further, in some cases, the updated timing advance signal comprises a variable compensation factor (δ). In some cases, the variable compensation factor δ is based on a timing difference between a first timing t1 for a received FD downlink transmission and a second timing t2 for a FD uplink transmission, wherein the variable compensation factor δ is based on the relationship: t1−t2−δ<CP, where CP is a cyclic prefix.

Figure 19:
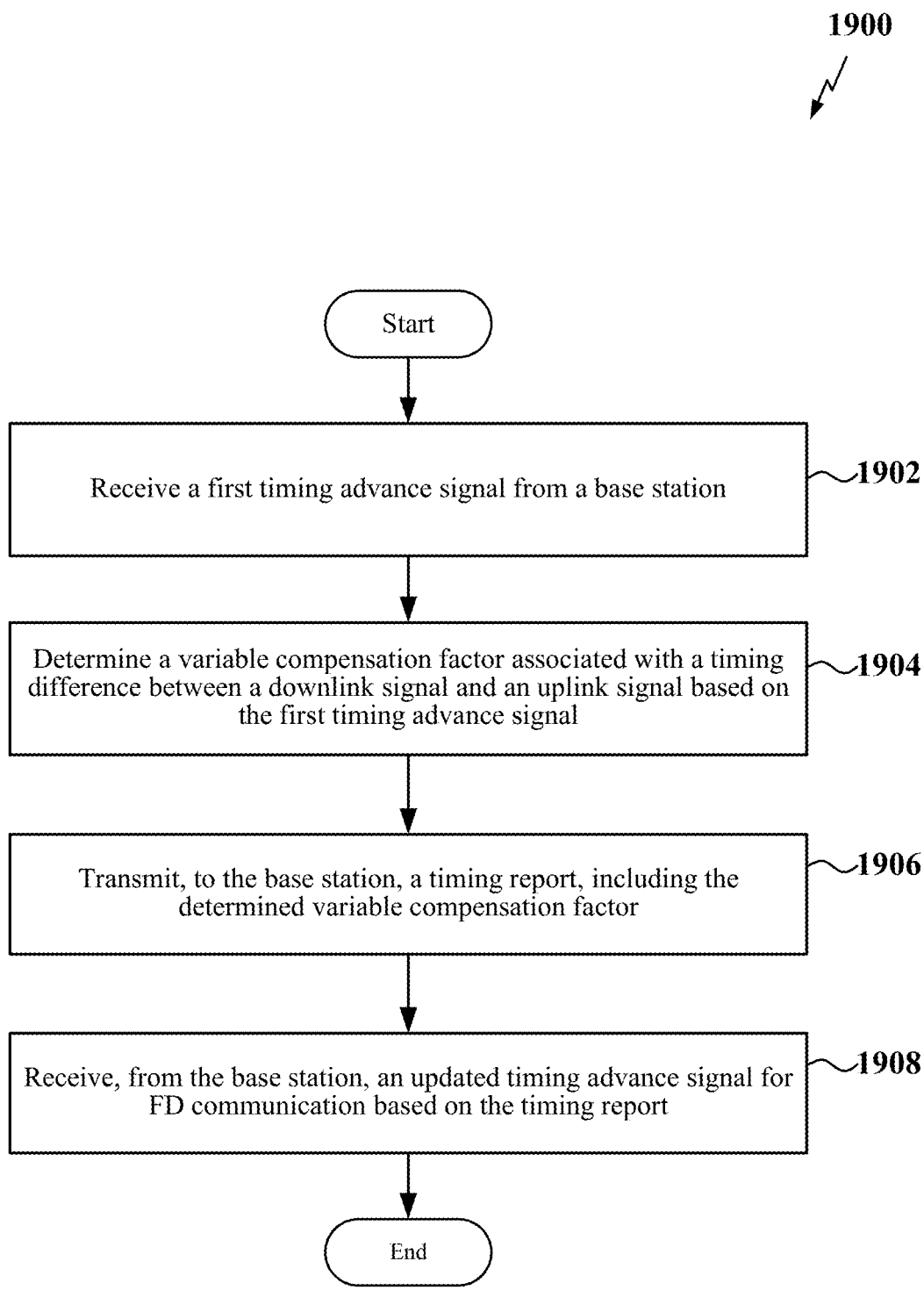
FIG. 19 is another flow chart illustrating an example process of FD communication at a UE using a timing advance indication signal according to some aspects.

FIG. 19 is another flow chart illustrating an example process 1900 of full duplex (FD) communication at a UE using a timing advance indication signal according to some aspects. As described below, some or all illustrated features may be omitted in a particular implementation within the scope of the present disclosure, and some illustrated features may not be required for implementation of all examples. In some examples, the process 1900 may be carried out by the UE 1500 illustrated in FIG. 15, by a processor or processing system, or by any suitable means for carrying out the described functions.

In block 1902, the UE receives a first timing advance signal from a base station.

In block 1904, the UE determines a variable compensation factor associated with a timing difference between a downlink signal and an uplink signal based on the first timing advance signal. For example, the timing advance circuitry 1542 shown and described above in connection with FIG. 15 may provide a means to determine the variable compensation factor.

In block 1906, the UE transmits, to the base station, a timing report, including the determined variable compensation factor.

In block 1908, the UE receives an updated timing advance signal for FD communication based on the timing report. In some cases, the updated timing advance signal is associated with at least one of an active beam pair link, an active transmission configuration index (TCI) state, a panel identifier, or a beam group.

In some cases, the updated timing advance comprises a second timing advance signal that is different from the first timing advance signal. In some cases, the second timing advance signal has a shorter timing offset from the first timing advance signal.

In some cases, the determining of the variable compensation factor comprises using layer 1 signal-to-interference noise ratio (L1-SINR) measurements. In some cases, the L1-SINR measurements comprise measured channel measurement resources (CMRs) and self-interference measurement resources (SIMRs) per one of a transmit/receive beam pair, a bi-directional transmission configuration index (TCI) state, a UE panel, a UE beam group or a UE.

In some cases, the updated timing advance signal comprises a second variable compensation factor to adjust the first timing advance. Further, in some cases, the second variable compensation factor is based on measurement of a timing difference between a first timing t1 for an FD downlink transmission and a second timing t2 for an FD uplink transmission, wherein the second variable compensation factor is determined according to the relationship: t1−t2−δ$_2$<CP, where CP is a cyclic prefix and δ$_2$ is the second variable compensation factor.

Further, in some cases, process 1900 may further include adjusting a start of an uplink slot using the second variable compensation factor to adjust the first timing advance.

Figure 20:
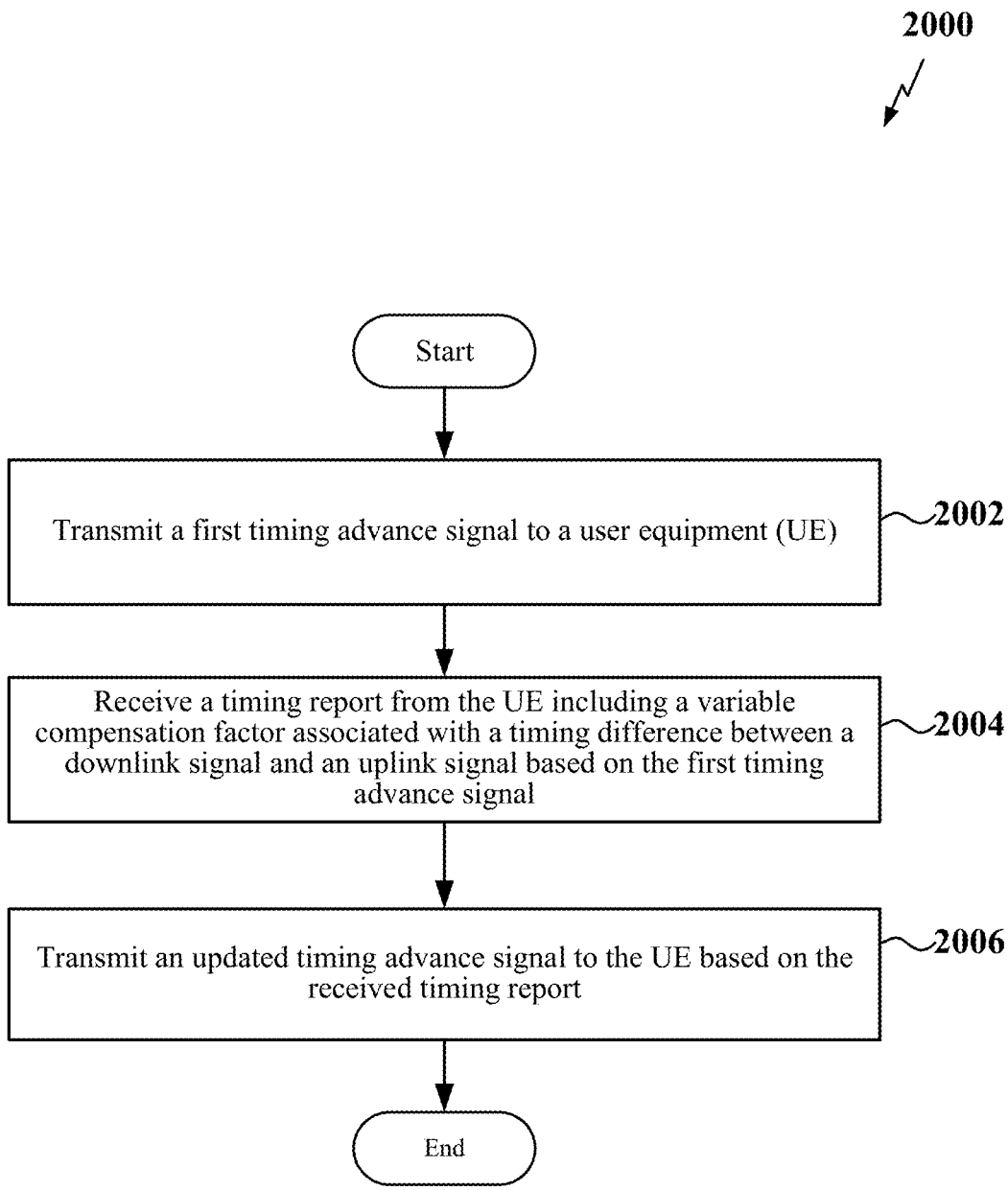
FIG. 20 is another flow chart illustrating an example process of FD communication at a base station using a timing advance indication signal according to some aspects.

FIG. 20 is another flow chart illustrating an example process 2000 of full duplex (FD) communication at a base station using a timing advance indication signal according to some aspects. As described below, some or all illustrated features may be omitted in a particular implementation within the scope of the present disclosure, and some illustrated features may not be required for implementation of all examples. In some examples, the process 2000 may be carried out by the BS 1600 illustrated in FIG. 16, by a processor or processing system, or by any suitable means for carrying out the described functions.

In block 2002, the base station transmits a first timing advance signal to a user equipment (UE).

In block 2004, the base station receives a timing report from the UE including a variable compensation factor associated with a timing difference between a downlink signal and an uplink signal based on the first timing advance signal.

In block 2006, the base station transmits an updated timing advance signal to the UE based on the received timing report. In some cases, the updated timing advance signal is associated with at least one of an active beam pair link, an active transmission configuration index (TCI) state, a panel identifier, or a beam group.

In some cases, the updated timing advance signal comprises a second timing advance signal that is different from the first timing advance signal. In some cases, the second timing advance signal has a shorter timing offset than the first timing advance signal.

In some cases, the updated timing advance signal comprises a second variable compensation factor to adjust the first timing advance. Further, in some cases, the second variable compensation factor is based on measurement of a timing difference between a first timing t1 for an FD downlink transmission and a second timing t2 for an FD uplink transmission, wherein the second variable compensation factor $\delta$ is determined according to the relationship: $t1-t2-\delta_2<CP$, where CP is a cyclic prefix and $\delta_2$ is the second variable compensation factor.

Example Clauses

Implementation examples are described in the following numbered clauses:

Clause 1: A method of full duplex (FD) communication at a user equipment, the method comprising: receiving a first timing advance signal from a base station; determining, based on the first timing advance signal, a timing difference between a downlink signal and an uplink signal is not within a threshold; transmitting a timing report to the base station, including the determined timing difference; and receiving, from the base station, an updated timing advance signal for full-duplex (FD) communication based on the timing report.

Clause 2: The method of Clause 1, wherein the threshold comprises a cyclic prefix value.

Clause 3: The method of Clause 1, wherein the threshold comprises a cyclic prefix value minus a downlink (DL) delay spread value.

Clause 4: The method of any one of Clauses 1-3, wherein the updated timing advance signal comprises a second timing advance signal that is different from the first timing advance signal.

Clause 5: The method of Clause 4, wherein the second timing advance signal has a shorter timing offset than the first timing advance signal.

Clause 6: The method of any one of Clauses 1-5, wherein the updated timing advance signal comprises a variable compensation factor.

Clause 7: The method of Clause 6, wherein: the variable compensation factor is based on the timing report, the method further comprises measuring the timing difference between a first timing (t1) for the downlink signal and a second timing (t2) for the uplink signal, the downlink signal comprises a received FD downlink transmission, the uplink signal comprises a received FD uplink transmission at the UE, and the variable compensation factor is based on a relationship: $t1-t2-\delta<CP$, where CP is a cyclic prefix and $\delta$ is the variable compensation factor.

Clause 8: The method of Clause 6, further comprising adjusting a start of an uplink slot for FD communication using the variable compensation factor.

Clause 9: The method of Clause 8, wherein the adjusting the start of the uplink slot comprises applying the variable compensation factor to an original timing advance value included in the first timing advance signal.

Clause 10: The method of any one of Clauses 1-9, wherein the updated timing advance signal is associated with at least one of an active beam pair link, an active transmission configuration index (TCI) state, a panel identifier, or a beam group.

Clause 11: A method of full duplex (FD) communication at a base station, the method comprising: transmitting a first timing advance signal to a user equipment (UE); receiving, based on the first timing advance signal, a timing report from the UE including a timing difference between a downlink signal and an uplink signal; and transmitting an updated timing advance signal to the UE for full-duplex (FD) communication based on the received timing report.

Clause 12: The method of Clause 11, wherein the updated timing advance signal comprises a second timing advance signal that is different from the first timing advance signal.

Clause 13: The method of Clause 12, wherein the second timing advance signal has a shorter timing offset from the first timing advance signal.

Clause 14: The method of Clause 11, wherein the updated timing advance signal comprises a variable compensation factor.

Clause 15: The method of Clause 14, wherein the variable compensation factor is based on a timing difference between a first timing t1 for a received FD downlink transmission and a second timing t2 for a FD uplink transmission, wherein the variable compensation factor is based on a relationship: $t1-t2-\delta<CP$, where CP is a cyclic prefix and $\delta$ is the variable compensation factor.

Clause 16: The method of any one of Clauses 11-15, wherein the updated timing advance signal is associated with at least one of an active beam pair link, an active transmission configuration index (TCI) state, a panel identifier, or a beam group.

Clause 17: A method of full duplex (FD) communication at a user equipment (UE), the method comprising: receiving, from a base station, a first timing advance signal; determining a variable compensation factor associated with a timing difference between a downlink signal and an uplink signal based on the first timing advance signal; and transmitting, to the base station, a timing report, including the determined variable compensation factor; and receiving, from the base station, an updated timing advance signal for FD communication based on the timing report.

Clause 18: The method of Clause 17, wherein the determining of the variable compensation factor comprises using layer 1 signal-to-interference noise ratio (L1-SINR) measurements.

Clause 19: The method of Clause 18, wherein the L1-SINR measurements comprise measured channel measurement resources (CMRs) and self-interference measurement resources (SIMRs) per one of a transmit/receive beam pair, a bi-directional transmission configuration index (TCI) state, a UE panel, a UE beam group or a UE.

Clause 20: The method of any one of Clauses 17-19, wherein the updated timing advance comprises a second timing advance signal that is different from the first timing advance signal.

Clause 21: The method of Clause 20, wherein the second timing advance signal has a shorter timing offset from the first timing advance signal.

Clause 22: The method of any one of Clauses 17-19, wherein the updated timing advance signal comprises a second variable compensation factor to adjust the first timing advance.

Clause 23: The method of Clause 22, wherein the second variable compensation factor is based on measurement of a timing difference between a first timing t1 for an FD downlink transmission and a second timing t2 for an FD uplink transmission, wherein the second variable compensation factor is based on a relationship: $t1-t2-\delta_2<CP$, where CP is a cyclic prefix and $\delta_2$ is the second variable compensation factor.

Clause 24: The method of any one of Clauses 22-23, further comprising adjusting a start of an uplink slot using the second variable compensation factor to adjust the first timing advance.

Clause 25: A method of full duplex (FD) communication at a base station, the method comprising: transmitting a first timing advance signal to a user equipment (UE); receiving a timing report from the UE including a variable compensation factor associated with a timing difference between a downlink signal and an uplink signal based on the first timing advance signal; and transmitting an updated timing advance signal to the UE based on the received timing report.

Clause 26: The method of Clause 25, wherein the updated timing advance signal comprises a second timing advance signal that is different from the first timing advance signal.

Clause 27: The method of Clause 26, wherein the second timing advance signal has a shorter timing offset than the first timing advance signal.

Clause 28: The method of Clause 25, wherein the updated timing advance signal comprises a second variable compensation factor.

Clause 29: The method of Clause 28, wherein the second variable compensation factor is based on the timing report, wherein the timing report is based on measurement of a timing difference between a first timing t1 for a received FD downlink transmission and a second timing t2 for a received FD uplink transmission at the UE, wherein the second variable compensation factor is determined according to a relationship: $t1-t2-\delta_2 < CP$, where CP is a cyclic prefix and $\delta_2$ is the second variable compensation factor.

Clause 30: The method of any of Clauses 25-29, wherein the updated timing advance signal is associated with at least one of an active beam pair link, an active transmission configuration index (TCI) state, a panel identifier, or a beam group.

Clause 31: An apparatus, comprising: transceiver; a memory; and a processor communicatively coupled to the transceiver and the memory, wherein the processor and the memory are configured to perform a method in accordance with any one of Clauses 1-30.

Clause 32: An apparatus, comprising means for performing a method in accordance with any one of Clauses 1-30.

Clause 33: A non-transitory computer-readable medium comprising instructions executable by one or more processors of an apparatus to perform a method in accordance with any one of Clauses 1-30.

Clause 34: A computer program product embodied on a computer-readable storage medium comprising code for performing a method in accordance with any one of Clauses 1-30.

Additional Considerations

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-20 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in any one or more of FIGS. 1, 2, 4, 5, and/or 7-17 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a user equipment (UE), comprising:
receiving a first timing advance signal from a base station;
receiving a downlink signal from the base station;
transmitting an uplink signal to the base station based on the first timing advance signal;
determining, based on the first timing advance signal, a timing difference between the downlink signal and the uplink signal is not within a threshold, wherein the threshold comprises a cyclic prefix value;
transmitting a timing report to the base station, including the determined timing difference; and
receiving, from the base station, an updated timing advance signal for full-duplex (FD) communication based on the timing report, wherein the updated timing advance signal is configured to adjust the timing difference to within the cyclic prefix value.

2. The method of claim 1, wherein the threshold further comprises the cyclic prefix value minus a downlink delay spread value.

3. The method of claim 1, wherein the updated timing advance signal comprises a second timing advance signal that is different from the first timing advance signal.

4. The method of claim 3, wherein the second timing advance signal has a shorter timing offset than the first timing advance signal.

5. The method of claim 1, wherein the updated timing advance signal comprises a variable compensation factor.

6. The method of claim 5, wherein:
the variable compensation factor is based on the timing report,
the method further comprises measuring the timing difference between a first timing (t1) for the downlink signal and a second timing (t2) for the uplink signal,
the downlink signal comprises an FD downlink transmission,
the uplink signal comprises an FD uplink transmission, and
the variable compensation factor is based on a relationship: $t1-t2-\delta<CP$, where CP is the cyclic prefix value and $\delta$ is the variable compensation factor.

7. The method of claim 5, further comprising adjusting a start of an uplink slot for FD communication using the variable compensation factor.

8. The method of claim 7, wherein the adjusting the start of the uplink slot comprises applying the variable compensation factor to an original timing advance value included in the first timing advance signal.

9. The method of claim 1, wherein the updated timing advance signal is associated with at least one of an active beam pair link, an active transmission configuration index (TCI) state, a panel identifier, or a beam group.

10. An apparatus for wireless communication at a base station, comprising:
one or more memories comprising executable instructions; and
one or more processors configured to execute and executable instructions and cause the base station to:
transmit a first timing advance signal to a user equipment (UE);
transmit a downlink signal to the UE;
receive an uplink signal from the UE based on the first timing advance signal;
receive based on the first timing advance signal, a timing report from the UE including a timing difference between the downlink signal and the uplink signal that is not within a threshold, wherein the threshold comprises a cyclic prefix value; and
transmit an updated timing advance signal to the UE for full-duplex (FD) communication based on the received timing report, wherein the updated timing advance signal is configured to adjust the timing difference to within the cyclic prefix value.

11. The apparatus of claim 10, wherein the updated timing advance signal comprises a second timing advance signal that is different from the first timing advance signal.

12. The apparatus of claim 11, wherein the second timing advance signal has a shorter timing offset from the first timing advance signal.

13. The apparatus of claim 10, wherein the updated timing advance signal comprises a variable compensation factor.

14. The apparatus of claim 13, wherein:
the downlink signal comprises an FD downlink transmission,
the uplink signal comprises an FD uplink transmission,
the variable compensation factor is based on a timing difference between a first timing t1 for the FD downlink transmission and a second timing t2 for the FD uplink transmission, and
the variable compensation factor is based on a relationship: $t1-t2-\delta<CP$, where CP is the cyclic prefix value and $\delta$ is the variable compensation factor.

15. The apparatus of claim 10, wherein the updated timing advance signal is associated with at least one of an active beam pair link, an active transmission configuration index (TCI) state, a panel identifier, or a beam group.

16. An apparatus for wireless communication at a user equipment (UE), comprising:
one or more memories comprising executable instructions; and
one or more processors configured to execute the executable instructions and cause the UE to:
receive a first timing advance signal from a base station;
receive a downlink signal from the base station;
transmit an uplink signal to the base station based on the first timing advance signal;
determine, based on the first timing advance signal, a timing difference between the downlink signal and the uplink signal is not within a threshold, wherein the threshold comprises a cyclic prefix value;
transmit a timing report to the base station, including the determined timing difference; and
receive, from the base station, an updated timing advance signal for full-duplex (FD) communication based on the timing report, wherein the updated timing advance signal is configured to adjust the timing difference to within the cyclic prefix value.

17. The apparatus of claim 16, wherein the threshold comprises the cyclic prefix value minus a downlink delay spread value.

18. The apparatus of claim 16, wherein the updated timing advance signal comprises a second timing advance signal that is different from the first timing advance signal.

19. The apparatus of claim 18, wherein the second timing advance signal has a shorter timing offset than the first timing advance signal.

20. The apparatus of claim 16, wherein the updated timing advance signal comprises a variable compensation factor.

21. The apparatus of claim 20, wherein:

the variable compensation factor is based on the timing report, the one or more processors are further configured to cause the UE to measure the timing difference between a first timing (t1) for the downlink signal and a second timing (t2) for the uplink signal, the downlink signal comprises an FD downlink transmission, the uplink signal comprises an FD uplink transmission, and the variable compensation factor is based on a relationship: $t1-t2-\delta<CP$, where CP is the cyclic prefix value and $\delta$ is the variable compensation factor.

22. The apparatus of claim 20, wherein the one or more processors are further configured to cause the UE to adjust a start of an uplink slot for FD communication using the variable compensation factor.

23. The apparatus of claim 22, wherein, in order to adjust the start of the uplink slot, the one or more processors are configured to cause the UE to apply the variable compensation factor to an original timing advance value included in the first timing advance signal.

24. The apparatus of claim 16, wherein the updated timing advance signal is associated with at least one of an active beam pair link, an active transmission configuration index (TCI) state, a panel identifier, or a beam group.

25. A non-transitory computer-readable medium for wireless communication at a user equipment (UE), comprising:

instructions that, when executed by one or more processors of the UE, cause the UE to:

receive a first timing advance signal from a base station;

receive a downlink signal from the base station;

transmit an uplink signal to the base station based on the first timing advance signal;

determine, based on the first timing advance signal, a timing difference between the downlink signal and the uplink signal is not within a threshold, wherein the threshold comprises a cyclic prefix value;

transmit a timing report to the base station, including the determined timing difference; and receive, from the base station, an updated timing advance signal for full-duplex (FD) communication based on the timing report, wherein the updated timing advance signal is configured to adjust the timing difference to within the cyclic prefix value.

26. The non-transitory computer-readable medium of claim 25, wherein the threshold further comprises the cyclic prefix value minus a downlink delay spread value.

27. The non-transitory computer-readable medium of claim 25, wherein the updated timing advance signal comprises a second timing advance signal that is different from the first timing advance signal and the second timing advance signal has a shorter timing offset than the first timing advance signal.

* * * * *